(12) United States Patent
Yamamoto et al.

(10) Patent No.: US 9,068,625 B2
(45) Date of Patent: Jun. 30, 2015

(54) FLUID-FILLED TYPE VIBRATION DAMPING DEVICE

(75) Inventors: Seiichiro Yamamoto, Komaki (JP);
Koichi Hasegawa, Kasugai (JP);
Masaaki Hamada, Kounan (JP)

(73) Assignee: TOKAI RUBBER INDUSTRIES, LTD., Komaki-shi (JP)

( * ) Notice: Subject to any disclaimer, the term of this patent is extended or adjusted under 35 U.S.C. 154(b) by 786 days.

(21) Appl. No.: 12/866,956

(22) PCT Filed: Dec. 10, 2009

(86) PCT No.: PCT/JP2009/006774
§ 371 (c)(1),
(2), (4) Date: Sep. 22, 2010

(87) PCT Pub. No.: WO2010/070850
PCT Pub. Date: Jun. 24, 2010

(65) Prior Publication Data
US 2011/0042873 A1    Feb. 24, 2011

(30) Foreign Application Priority Data

Dec. 18, 2008 (JP) .................. 2008-322120
Dec. 18, 2008 (JP) .................. 2008-322121

(51) Int. Cl.
*F16F 13/26* (2006.01)
*F16F 13/10* (2006.01)

(52) U.S. Cl.
CPC ............. *F16F 13/262* (2013.01); *F16F 13/106* (2013.01); *F16F 13/264* (2013.01); *F16F 13/266* (2013.01)

(58) Field of Classification Search
CPC ..... F16F 13/106; F16F 13/262; F16F 13/266; F16F 13/264

USPC ......................... 267/140.14, 140.15
See application file for complete search history.

(56) References Cited

U.S. PATENT DOCUMENTS 4,693,455 A    9/1987  Andrä
4,877,225 A *  10/1989 Noguchi et al. ......... 267/140.14
(Continued)

FOREIGN PATENT DOCUMENTS

JP    A 62-127539    6/1987
JP    A-4-165139    6/1992
(Continued)

OTHER PUBLICATIONS

International Preliminary Report on Patentability issued in International Patent Application No. PCT/JP2009/006774 dated Jul. 5, 2011.
(Continued)

*Primary Examiner* — Bradley King
(74) *Attorney, Agent, or Firm* — Oliff PLC

(57) ABSTRACT

A fluid-filled type vibration damping device having a first and a second fluid chamber respectively filled with non-compressible fluid and which experience relative pressure fluctuations during vibration input, and provided with an orifice passage through which the first fluid chamber and the second fluid chamber communicate with one another, while being capable of exhibiting better dependability and durability in terms of effective vibration damping action of several types of vibration with different frequencies. In the device, tuning frequency of the orifice passage is varied by varying a passage length of the orifice passage 68 through adjustment of an insertion distance of an inside orifice member into an outside orifice member.

21 Claims, 13 Drawing Sheets

(56) References Cited

U.S. PATENT DOCUMENTS

| | | | | |
|---|---|---|---|---|
| 5,209,462 | A | * | 5/1993 | Le Fol et al. ............... 267/219 |
| 5,213,315 | A | | 5/1993 | Hartel et al. |
| 5,242,158 | A | * | 9/1993 | Robic et al. ............ 267/140.14 |
| 5,297,769 | A | * | 3/1994 | Le Fol et al. ........... 267/140.13 |
| 5,439,204 | A | * | 8/1995 | Yamazoe et al. ........ 267/140.14 |
| 5,601,280 | A | * | 2/1997 | Nagaya et al. .......... 267/140.14 |
| 6,036,183 | A | * | 3/2000 | Lee et al. ............... 267/140.14 |
| 7,188,830 | B2 | | 3/2007 | Kato et al. |
| 7,275,739 | B2 | * | 10/2007 | Winkler .................. 267/140.14 |
| 8,104,750 | B2 | * | 1/2012 | Hasegawa et al. ...... 267/140.14 |
| 8,292,047 | B2 | * | 10/2012 | Vannucci ................. 188/266.6 |
| 2011/0042872 | A1 | * | 2/2011 | Hasegawa et al. ...... 267/140.14 |

FOREIGN PATENT DOCUMENTS

| | | |
|---|---|---|
| JP | A 4-171335 | 6/1992 |
| JP | A-4-272531 | 9/1992 |
| JP | A 5-001739 | 1/1993 |
| JP | A 5-231469 | 9/1993 |
| JP | U 7-018046 | 3/1995 |
| JP | A 9-049541 | 2/1997 |
| JP | A 2002-005226 | 1/2002 |
| JP | A 2006-017134 | 1/2006 |
| JP | A 2006-266425 | 10/2006 |

OTHER PUBLICATIONS

International Search Report issued in corresponding International Application No. PCT/JP2009/006774, mailed Mar. 16, 2010, (with English-language translation).

Sep. 6, 2013 Chinese Office Action issued in Chinese Patent Application No. 200980149794.5 (with translation).

Oct. 11, 2013 Office Action issued in Japanese Patent Application No. 2010-519041 (with translation).

Nov. 14, 2013 Office Action issued in German Patent Application No. 11 2009 001 851.3 (with English-language translation).

* cited by examiner

FLUID-FILLED TYPE VIBRATION DAMPING DEVICE

TECHNICAL FIELD

The present invention relates to a vibration damping device such as an engine mount for example; and relates in particular to a fluid-filled type vibration damping device adapted to give rise to vibration damping by utilizing the flow action of a non-compressible fluid filling the interior.

BACKGROUND ART

Vibration damping devices designed for installation between components making up a vibration transmission system in order to provide vibration damping linkage and vibration damping support between the components are known in the art. One example is an engine mount for providing vibration damping support of an automotive power unit on the vehicle body.

In the field of automotive engine mounts, a high degree of vibration damping capability is required for improved ride comfort. To meet this need, there have been proposed a number of fluid-filled type vibration damping devices designed to utilize the flow action, such as resonance action, of a non-compressible fluid filling the interior. A fluid-filled type vibration damping device of this design has a first fluid chamber and a second fluid chamber that give rise to relative pressure fluctuations at times of vibration input and that communicate through an orifice passage, the first fluid chamber and the second fluid chamber being filled with a non-compressible fluid. Vibration damping action is produced through action such as resonance action of the non-compressible fluid flowing through the orifice passage.

One requirement of an automotive engine mount is to provide vibration damping of multiple types of vibration having different frequency and amplitude, depending on factors such as engine speed and vehicle driving conditions. However, while the orifice passage affords excellent vibration damping action of vibration having the frequency to which it has been pre-tuned, in the case of vibration of high frequency above the tuning frequency, extremely high dynamic spring may arise due to antiresonance, and the resultant appreciable drop in vibration damping capability can sometimes be a problem.

Accordingly, in the prior art there have been proposed structures that afford variable orifice passage length, such as that disclosed in Patent Citation 1 (JP-U 7-18046) for example. Specifically, the orifice passage is defined by two orifice-defining members assembled in relatively rotatable fashion and extends in the direction of relative rotation of the members to provide a construction whereby the length of the orifice passage is variable through relative rotation of the two orifice-defining members. According to this variable length construction of the orifice passage, it is possible to adjust the tuning frequency of the orifice passage and to provide vibration damping of several types of vibration of different frequencies.

However, a conventional variable orifice passage length structure like that disclosed in Patent Citation 1 requires that an electric motor for driving rotation of the orifice-defining members be provided to the outside of the mount assembly. This makes it necessary for the drive transmission member that transmits the driving force of the electric motor to the orifice-defining members situated inside the mount assembly to be passed through the fluid chambers, namely the first fluid and second fluid chambers, from the outside to the inside. Where the drive transmission member is arranged passing through the fluid chambers in this way, the sealing structure for the fluid chamber of necessity becomes more complicated, posing a risk of being less durable and dependable; and the mount manufacturing operation, e.g. the fluid sealing operation during attachment of the drive transmission member, is considerably more difficult, posing a number of unresolved issues in terms of commercial viability.

Patent Citations 2 and 3 (JP-A 5-1739 and JP-A 5-231469) disclose a structure in which the orifice passage is defined by a gap formed between the opposing faces of two orifice members so that the cross-sectional area of the orifice passage may be varied by moving these two orifice members closer together or further apart in the direction of opposition.

However, in structures for providing the orifice passage with variable cross-sectional area as disclosed in Patent Citations 2 and 3, the gap extends in the circumferential direction, so making the cross-sectional area of the orifice passage smaller necessitates making the gap correspondingly narrow, which creates the problem of excessively high fluid flow resistance due to the narrowness of the gap. Specifically, while it is theoretically possible to set the tuning frequency of the orifice passage to a lower level by constricting the gap, a problem encountered in actual practice is that flow resistance rises to the point that an adequate level of fluid flow is not readily assured, making it difficult to achieve the desired orifice action.

Additionally, varying the dimension of the gap necessitates relative displacement of the opposing faces that define the gap, in the direction of their opposition. Relative displacement of the opposing faces situated in opposition across a narrow gap is associated with inflow of fluid to between the opposing faces or outflow of fluid from between the opposing faces, and this inflow or outflow of fluid inevitably produces a high level of resistance. The resultant difficulty of varying the size of gap between the opposing faces in a rapid manner may pose problems in terms of ensuring adequate response speed and levels of drive force.

PRIOR ART DOCUMENT

Patent Citation

[Patent Citation 1] JP-U 7-18046
[Patent Citation 2] JP-A 5-1739
[Patent Citation 3] JP-A 5-231469

SUMMARY OF THE INVENTION

Problem the Invention Attempts to Solve

With the foregoing in view, it is accordingly an object of the present invention to provide a fluid-filled type vibration damping device of novel construction designed to afford better dependability and durability in terms of effective vibration damping action of several types of vibration with different frequencies.

Means for Solving the Problem

A first mode of the present invention resides in a fluid-filled type vibration damping device having a first fluid chamber and a second fluid chamber respectively filled with non-compressible fluid and which experience relative pressure fluctuations during vibration input, and provided with an orifice passage through which the first fluid chamber and the second fluid chamber communicate with one another, the fluid-filled type vibration damping device being characterized in that: the device includes: an outside orifice member having a passage hole that defines an outside peripheral wall face of the orifice passage; an inside orifice member arranged inserted into the passage hole of the outside orifice member from one opening thereof and defining an inside peripheral wall face of the orifice passage; the orifice passage defined by a cylindrical gap formed between inside and outside peripheral faces of the outside orifice member and the inside orifice member; and an actuator adapted to adjust an insertion distance of the inside orifice member into the outside orifice member, a passage length of the orifice passage being variable through adjustment with the actuator of the insertion distance of the inside orifice member into the outside orifice member.

According to the first mode, the tuning frequency of the orifice passage is varied by varying the passage length of the orifice passage through adjustment of the insertion distance of the inside orifice member into the outside orifice member. Thus, the tuning frequency of the orifice passage can be varied according to the frequency of vibration to be damped, making it possible to adjust the frequency range in which vibration damping is produced on the basis of fluid flow action through the orifice passage. As a result, in instances of input of several types of vibration having different frequencies or of vibrations over a wide frequency range, it is possible to achieve passive vibration damping of the vibrations.

Moreover, varying the passage length of the orifice passage in order to vary the tuning frequency of the orifice passage can be accomplished without varying the size of the cylindrical gap defined between the inside and outside peripheral faces of the outside orifice member and the inside orifice member. It is accordingly possible to tune the orifice passage to a low frequency range by increasing the passage length, while at the same time maintaining the gap dimension of the orifice passage. Thus, unlike the case where the tuning frequency of the orifice passage is adjusted by varying the size of the gap by making the gap narrower or wider as taught in Patent Citations 2 and 3, it is possible to vary the tuning frequency of the orifice passage while ensuring an ample level of fluid flow so as to maintain excellent orifice action, and in particular to do so while tuning the passage to the low frequency range.

Furthermore, changing the passage length of the orifice passage entails no change in the gap dimension of the cylindrical gap (i.e. the distance between the inside and outside peripheral faces of the outside orifice member and the inside orifice member), so resistance caused by inflow or outflow of fluid into or out from the cylindrical gap is negligible. For this reason, it is possible to vary tuning of the orifice passage rapidly and with a minimum of drive force.

Additionally, because the orifice passage is formed between the inside and outside peripheral faces of the outside orifice member and the inside orifice member, it is possible to vary the tuning frequency of the orifice passage without producing sliding motion of the inside orifice member relative to the outside orifice member. It is accordingly possible to avoid damage due to wear. Durability may be improved as a result, and the dependability of operation of the inside orifice member by the actuator can be improved.

Further, because the outside orifice member and the inside orifice member that define the orifice passage are assembled with a gap between them, dimensional precision requirements are lower than would be the case where these components are assembled together through a mated fit or pressure fit. Thus, management of precision of components is easier, as is the manufacturing process.

Additionally, because the orifice passage is defined by a cylindrical gap, it is possible to avoid variation in the cross-sectional area of the orifice passage, even if the inside orifice member is positioned eccentrically with respect to the outside orifice member. An easier production process is possible as a result.

A second mode of the present invention resides in the device according to the first mode wherein the first fluid chamber is constituted by a primary fluid chamber adapted to give rise to pressure fluctuations at times of vibration input and whose wall is constituted in part by a moveable rubber film, and an auxiliary fluid chamber situated on an opposite side of the moveable rubber film from the primary fluid chamber and adapted to receive pressure fluctuations of the primary fluid chamber transmitted on a basis of an elastic deformation of the moveable rubber film, and whose wall is defined in part by the inside orifice member; the second fluid chamber is adapted to readily undergo changes in volume; and the auxiliary fluid chamber and the second fluid chamber communicate with one another through the orifice passage.

According to the second mode, by utilizing elastic resonance of the moveable rubber film and increasing the level of fluid flow through the orifice passage it is possible to improve vibration damping based on flow action such as resonance action of fluid flowing through the orifice passage. In instances where elastic resonance of the moveable rubber film is utilized, the natural frequency of the moveable rubber film may be tuned by securing a metal mass or the like to the moveable rubber film. Alternatively, the natural frequency of the moveable rubber film may be tuned by modifying the constituent material, thickness dimension, or shape of the moveable rubber film.

A third mode of the present invention resides in a device according to the second mode wherein the moveable rubber film is positioned covering an opening at the primary fluid chamber end of the passage hole of the outside orifice member, and the inside orifice member, when positioned inserted into the passage hole of the outside orifice member from another opening thereof at an opposite end from the primary fluid chamber, is displaceable in a direction approaching the moveable rubber film until coming into contact against the moveable rubber film.

According to the third mode, it is possible for the inside orifice member to be positioned in contact against the moveable rubber film so as to constrain the moveable rubber film.

A fourth mode of the present invention resides in a device according to the first mode wherein the inside orifice member is cylindrical shaped having a supporting rubber film disposed covering one opening thereof; the inside orifice member is mounted on an output shaft of the actuator via the supporting rubber film; the supporting rubber film partially constitutes the wall of the first fluid chamber adapted to give rise to pressure fluctuation at times of vibration input; and the second fluid chamber readily permits changes in volume.

According to the fourth mode, by utilizing elastic resonance of the supporting rubber film and increasing the level of fluid flow through the orifice passage, it is possible to improve vibration damping based on flow action such as resonance action of fluid flowing through the orifice passage.

A fifth mode of the present invention resides in a device according to any of the first to fourth modes including a low-frequency orifice passage through which the first fluid chamber and the second fluid chamber communicate with one another.

According to the fifth mode, vibration damping on the basis of fluid flow action through the low-frequency orifice passage may be obtained in addition to vibration damping on the basis of fluid flow action through the variable-length orifice passage.

A sixth mode of the present invention resides in a device according to the fifth mode wherein a tuning frequency of the low-frequency orifice passage is set within a variable tuning frequency range of the orifice passage.

According to the sixth mode, the tuning frequency of the orifice passage can be set to lower frequency than the tuning frequency of the low-frequency orifice passage. It is accordingly possible to prevent fluid flow through the orifice passage at times of vibration input in the frequency range of the low-frequency orifice passage and to ensure ample flow of fluid through the low-frequency orifice passage. As a result, effective vibration damping may be produced on the basis of fluid flow action through the low-frequency orifice passage.

A seventh mode of the present invention resides in a device according to the fifth or sixth mode wherein the second fluid chamber includes a first equilibrium chamber connected to the first fluid chamber through the low-frequency orifice passage, and a second equilibrium chamber connected to the first fluid chamber through the orifice passage and independent of the first equilibrium chamber.

According to the seventh mode, the respective wall spring rigidities of the first equilibrium chamber and the second equilibrium chamber can be set independently. As a result, there is a greater degree of freedom in respective tuning of the low-frequency orifice passage and the orifice passage.

An eighth mode of the present invention resides in a device according to any one of first through sixth modes wherein a first mounting member is arranged spaced apart from one opening of a second mounting member of cylindrical shape, the first mounting member and the second mounting member being linked by a main rubber elastic body; and the outside orifice member is fitted into and secured within the second mounting member while the inside orifice member is arranged inserted into the passage hole of the outside orifice member from another opening of the second mounting member, thereby orienting the orifice passage so as to extend in an axial direction of a mount.

A ninth mode of the present invention resides in a device according to the eighth mode wherein the low-frequency orifice passage is formed in the outside orifice member.

According to the ninth mode, space for forming the low-frequency orifice passage may be readily assured.

A tenth mode of the present invention resides in a device according to the second or third modes wherein a first mounting member is arranged spaced apart from one opening of a second mounting member of cylindrical shape, the first mounting member and the second mounting member being linked by a main rubber elastic body; the outside orifice member of cylindrical shape is fitted into and secured within the second mounting member with the moveable rubber film disposed covering one opening of the outside orifice member; the primary fluid chamber whose wall is constituted in part by the main rubber elastic body is formed to one side of the moveable rubber film and adapted to give rise to pressure fluctuations at times of vibration input, while the auxiliary fluid chamber to an other side of the moveable rubber film receives pressure fluctuations of the primary fluid chamber transmitted on the basis of the elastic deformation of the moveable rubber film; the inside orifice member is arranged inserted into the passage hole of the outside orifice member from an other opening of the second mounting member; and the second fluid chamber adapted to readily permit changes in volume is formed further towards another opening of the second mounting member than the outside orifice member, with the auxiliary fluid chamber and the second fluid chamber communicating with one another through the orifice passage.

An eleventh mode of the present invention resides in a device according to the fourth mode wherein a first mounting member is arranged spaced apart from one opening of a second mounting member of cylindrical shape, the first mounting member and the second mounting member being linked by a main rubber elastic body; the outside orifice member is fitted into and secured within the second mounting member while the inside orifice member of cylindrical shape is arranged inserted into the passage hole of the outside orifice member from an other opening of the second mounting member; the first fluid chamber whose wall is constituted in part by the supporting rubber film is arranged covering the main rubber elastic body and one opening of the inside orifice member; and the second fluid chamber adapted to readily permit changes in volume is formed further towards the other opening of the second mounting member than the outside orifice member.

A twelfth mode of the present invention resides in a device according to the seventh mode wherein a first mounting member is arranged spaced apart from one opening of a second mounting member of cylindrical shape, the first mounting member and the second mounting member being linked by a main rubber elastic body; the outside orifice member of cylindrical shape is fitted into and secured within the second mounting member while the inside orifice member is arranged inserted into the passage hole of the outside orifice member from one opening thereof; the first equilibrium chamber adapted to readily permit changes in volume is formed further towards another opening of the second mounting member than the outside orifice member; the first equilibrium chamber and the first fluid chamber whose wall is constituted in part by the main rubber elastic body and adapted to give rise to pressure fluctuations at times of vibration input communicate with one another through the low-frequency orifice passage formed in the outside orifice member; the second equilibrium chamber adapted to readily permit changes in volume is formed inside the passage hole of the outside orifice member; and the first fluid chamber and the second equilibrium chamber communicate with one another through the orifice passage.

A thirteenth mode of the present invention resides in a device according to any of the first to twelfth modes wherein the cylindrical gap has a tapered cylindrical shape.

According to the thirteenth mode, it is possible to vary not only the passage length of the orifice passage, but also the cross-sectional area. A greater range of variation of the tuning frequency of the orifice passage is achieved as a result.

A fourteenth mode of the present invention resides in a device according to any of the first to thirteenth modes wherein the actuator is situated in an outside atmosphere.

According to the fourteenth mode, there is no need to ensure sealing of the driving section. Improved dependability and durability of the fluid-filled type vibration damping device is achieved as a result.

A fifteenth mode of the present invention resides in a device according to any of the first, second, fourth to seventh, ninth, or eleventh to fourteenth modes provided with oscillatory driving member for oscillatory driving of the inside orifice member.

According to the fifteenth mode, resonance action of fluid flowing through the orifice passage may be utilized for efficient control of internal pressure in the fluid chamber in which pressure fluctuations arise at times of vibration input. It is therefore possible to efficiently produce active vibration damping over a wide frequency range.

Through combination with the features of the second mode, pressure fluctuations arising in the auxiliary fluid chamber on the basis of oscillating displacement of the inside orifice member may be transmitted to the primary fluid chamber through elastic deformation of the moveable rubber film.

Also, through combination with the features of the second mode, elastic resonance of the moveable rubber film may be utilized to increase the level of fluid flow through the orifice passage. It is possible as a result to more efficiently carry out control of internal pressure of the auxiliary fluid chamber, and hence control of internal pressure of the primary fluid chamber.

Through combination with the features of the fourth mode, it is possible for the oscillating force of the oscillatory driving member to be applied to the supporting rubber film only. The load on the oscillatory driving member can be reduced as a result.

Through combination with the features of the fifth mode, it is possible to obtain vibration damping based on flow action such as resonance action of fluid flowing through the low-frequency orifice passage as well.

A sixteenth mode of the present invention resides in a device according to the third mode including oscillatory driving member for oscillatory driving of the inside orifice member, adapted to produce oscillatory driving with the inside orifice member disposed in contact against the moveable rubber film.

According to the sixteenth mode, pressure fluctuations of the primary fluid chamber may be controlled directly on the basis of oscillating displacement of the inside orifice member.

A seventeenth mode of the present invention resides in a device according to the sixteenth mode wherein the outside orifice member is supported displaceably in a direction of oscillation by the oscillatory driving member.

According to the seventeenth mode, a larger piston surface area can be obtained. Pressure fluctuations of the primary fluid chamber are easily controlled as a result.

An eighteenth mode of the present invention resides in a device according to the eighth mode including oscillatory driving member for oscillatory driving of the inside orifice member, adapted to oscillate the inside orifice member in the axial direction of the mount.

A nineteenth mode of the present invention resides in a device according to the tenth mode including oscillatory driving member for oscillatory driving of the inside orifice member, wherein the inside orifice member is situated at a location facing the moveable rubber film in the direction of oscillation by the oscillatory driving member, and the auxiliary fluid chamber is formed between the opposed faces of the inside orifice member and the moveable rubber film.

A twentieth mode of the present invention resides in a device according to any of the fifteenth to nineteenth modes wherein the oscillatory driving member is situated in an outside atmosphere.

According to the twentieth mode, there is no need to ensure sealing of the driving section. Improved dependability and durability of the fluid-filled type vibration damping device is achieved as a result.

A twenty-first mode of the present invention resides in a device according to any of the fifteenth to nineteenth modes wherein the oscillatory driving member comprises the actuator.

According to the twenty-first mode, fewer parts are required. A simpler construction is possible as a result.

Effect of the Invention

According to the present invention, variation of the tuning frequency of the orifice passage is carried out through adjustment of the insertion or intrusion distance of the inside orifice member into the outside orifice member. Thus, effective vibration damping action of several types of vibration with different frequencies may be achieved with better dependability and durability.

EMBODIMENTS FOR CARRYING OUT THE INVENTION

The embodiments of the present invention are described below with reference to the accompanying drawings.

Figure 1:
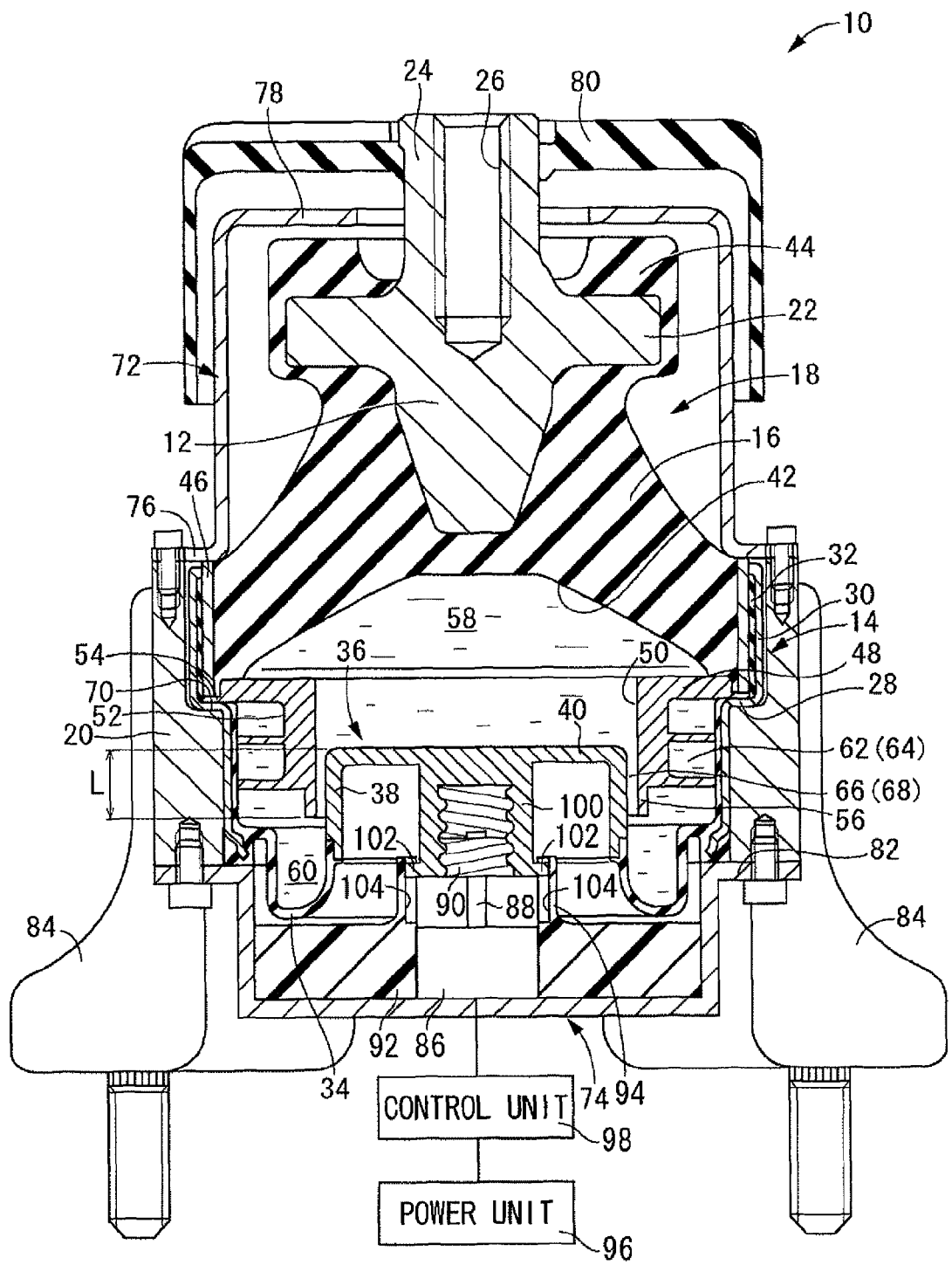
FIG. 1 is a longitudinal cross sectional view of a fluid-filled type vibration damping device in the form of an automotive engine mount according to a first embodiment of the present invention.

Referring first to FIG. 1, there is depicted an automotive engine mount 10 as a first embodiment of the fluid-filled type vibration damping device according to the present invention. This engine mount 10 has a construction in which a mount assembly 18, composed of a first mounting member 12 and a second mounting member 14 arranged spaced apart in opposition to one another and elastically linked by a main rubber elastic body 16 interposed between them, fits within a bracket 20. The engine mount 10 is designed to provide vibration damping support of the power unit on the vehicle body by attaching the first mounting member 12 to a power unit (not shown) and attaching the second mounting member 14 to the vehicle body (not shown). In this installed state, the distributed load of the power unit is exerted on the engine mount 10 across the first mounting member 12 and the second mounting member 14 in the direction of center axis of the mount, which is the vertical direction in FIG. 1, thereby inducing the main rubber elastic body 16 to undergo elastic deformation in the direction of the first mounting member 12 and the second mounting member 14 moving closer together. The direction in which the principal vibrations targeted for damping are input across the first mounting member 12 and the second mounting member 14 is the direction in which the two mounting members 12, 14 move closer together and further apart. In the following description, as a general rule, the vertical direction refers to the vertical direction in FIG. 1.

Turning now to a more detailed discussion, the first mounting member 12 is made of metal, and has an inverted frustoconical shape overall. A stopper portion 22 of circular disk shape is integrally formed at the large-diameter end of the first mounting member 12 and projects outward in the diametrical direction. Additionally, a fastening shaft 24 projects axially upward from the large-diameter end of the first mounting member 12, and a fastening screw hole 26 is formed in the fastening shaft 24 and opens onto its upper end face.

The second mounting member 14 is also made of metal, and has a stepped round cylindrical shape with a step portion 28 formed in the axial medial section. The axial upper side of the second mounting member 14 above the step portion 28 constitutes a large-diameter portion 30. A thin seal rubber layer 32 is formed sheathing the inside peripheral face of the large-diameter portion 30.

A diaphragm 34 provided as a flexible film is disposed at the opening on the axial lower end of the second mounting member 14. The outside peripheral edge of the diaphragm 34 is vulcanization bonded to the edge around the opening at the axial lower end of the second mounting member 14 so as to fluidtightly cover the opening at the axial lower end of the second mounting member 14. An inside orifice member 36 is anchored to the center section of the diaphragm 34.

The inside orifice member 36 is formed of metal, and has inverted cup shape overall. In other words, the inside orifice member 36 has a structure in which the opening at the axial upper end of a cylindrical wall portion 38 is lidded by an upper base wall portion 40. In the present embodiment in particular, the cylindrical wall portion 38 takes the form of a round cylinder that extends along a straight path with substantially unchanging inside and outside diameter dimensions. The cylindrical wall portion 38 is thereby provided with a round cylindrical outside peripheral face.

The diaphragm 34 is vulcanization bonded at its inside peripheral edge to the open end of this cylindrical wall portion 38 of the inside orifice member 36. The inside orifice member 36 is thereby anchored to the center section of the diaphragm 34.

The first mounting member 12 is positioned spaced apart to the axial upper side of the second mounting member 14 described above, with the main rubber elastic body 16 elastically linking the first mounting member 12 and the second mounting member 14.

The main rubber elastic body 16 is generally frustoconical in shape overall, and has a bowl-shaped recess 42 formed on its large-diameter end face. At the small-diameter end face of the main rubber elastic body 16, the first mounting member 12 has been inserted in the axial direction and vulcanization bonded in place. The stopper portion 22 of the first mounting member 12 is juxtaposed against and vulcanization bonded to the small-diameter end face of the main rubber elastic body 16, and a cushioning rubber piece 44 integrally formed with the main rubber elastic body 16 extends upward beyond the stopper portion 22. A connecting sleeve 46 is vulcanization bonded to the outside peripheral face of the large-diameter end of the main rubber elastic body 16.

The connecting sleeve 46 which is vulcanization bonded to the outside peripheral face of the large-diameter end of the main rubber elastic body 16 is fitted inside the large-diameter portion 30 of the second mounting member 14, and the large-diameter portion 30 is then subjected to a diameter-reducing process to secure the main rubber elastic body 16 fitting fluidtightly together with the second mounting member 14. The opening at the axial upper end of the second mounting member 14 is thereby covered fluidtightly by the main rubber elastic body 16. As a result, a zone that is fluidtightly isolated from the outside space is formed between the opposed faces of the main rubber elastic body 16 and the diaphragm 34 inside the second mounting member 14, and the zone is filled with a non-compressible fluid.

As the non-compressible fluid it is possible to employ water, an alkylene glycol, a polyalkylene glycol, or silicone oil for example. In terms of advantageously achieving vibration damping based on resonance action of the fluid, a low-viscosity fluid having viscosity of 0.1 Pa·s or lower is especially preferred.

An outside orifice member 48 is set in the second mounting member 14 and arranged between the opposed faces of the main rubber elastic body 16 and the diaphragm 34. The outside orifice member 48 is made of metal, and has the form of a thick circular block with a passage hole 50 passing through in the axial direction. In the present embodiment in particular, the passage hole 50 extends along a straight path with a substantially unchanging inside diameter dimension. A circumferential groove 52 opening at the outside peripheral face and extending along a helical path for a distance slightly less than twice about the circumference is formed in the outside orifice member 48. A flanged portion 54 that spreads diametrically outward is formed at the axial upper end of the outside orifice member 48. A tubular extended wall portion 56 that protrudes out towards the bottom is provided along the inside peripheral face at the lower inside peripheral edge of the outside orifice member 48.

This outside orifice member 48 is arranged with the flanged portion 54 juxtaposed against the step portion 28 of the second mounting member 14, and is secured clasped between the step portion 28 and the connecting sleeve 46. The outside orifice member 48 is thereby disposed extending in the axis-perpendicular direction between the opposed faces of the main rubber elastic body 16 and the diaphragm 34 so as to divide the interior of the second mounting member 14 into two parts to either side in the axial direction. As a result, to the upper side of the outside orifice member 48 there is defined a first fluid chamber 58 whose wall is partially constituted by the main rubber elastic body 16, and adapted to give rise to pressure fluctuations based on elastic deformation of the main rubber elastic body 16 at times of vibration input. To the lower side of the outside orifice member 48 there is defined a second fluid chamber 60 whose wall is partially constituted by the diaphragm 34, and adapted to readily permit changes in volume.

In this state, the outside peripheral opening of the circumferential groove 52 formed on the outside peripheral face of the outside orifice member 48 is covered by the small-diameter section of the second mounting member 14 (the section below the step portion 28) via the intervening seal rubber layer 32 to form a circumferential direction passage 62 that utilizing the circumferential groove 52 extends along a helical path in the circumferential direction. This circumferential direction passage 62 connects at one end to the first fluid chamber 58, and connects at the other end to the second fluid chamber 60. Thus, utilizing the circumferential direction passage 62 there is formed a low-frequency orifice passage 64 that connects the first fluid chamber 58 and the second fluid chamber 60 to one another. The low-frequency orifice passage 64 is tuned to a frequency range corresponding to engine shake vibration.

The inside orifice member 36 is inserted from below in the axial direction into the passage hole 50 of the outside orifice member 48 which has been arranged as described above. In the present embodiment, with the inside orifice member 36 inserted to the maximum extent into the passage hole 50 of the outside orifice member 48, the upper end face of the inside orifice member 36 is positioned at the approximate axial center of the passage hole 50. In the present embodiment, the first fluid chamber 58 includes the zone situated to the upper side of the upper end face of the inside orifice member 36 within the passage hole 50 of the outside orifice member 48.

Insertion of the inside orifice member 36 into the passage hole 50 of the outside orifice member 48 as described above creates a cylindrical gap 66 between the inside peripheral face of the outside orifice member 48 and the outside peripheral face of the inside orifice member 36. In the present embodiment in particular, the cylindrical gap 66 extends along a straight path in the axial direction with a substantially unchanging gap dimension. One end of this cylindrical gap 66 connects to the first fluid chamber 58 while the other end connects to the second fluid chamber 60. Thus, utilizing the cylindrical gap 66 there is formed an orifice passage 68 that connects the first fluid chamber 58 and the second fluid chamber 60 to one another. Specifically, the outside peripheral wall of the orifice passage 68 is defined by the outside orifice member 48, and the inside peripheral wall is defined by the inside orifice member 36. In the present embodiment, the variation band for the tuning frequency of the orifice passage 68 is set such that the tuning frequency of the low-frequency orifice passage 64 lies within the range for variable tuning frequency of the orifice passage 68. In other words, according to the present embodiment, the lower limit of frequency to which the orifice passage 68 may be tuned is set to lower frequency than the tuning frequency of the low-frequency orifice passage 64. In the present embodiment, the frequency of the orifice passage 68 may be tuned so as to produce effective vibration damping of idling vibration.

The mount assembly 18 constructed in the above manner is secured to the bracket 20 by setting the second mounting member 14 in the bracket 20. The bracket 20 has the form of a thick-walled round cylinder whose inside peripheral face is greater in diameter to the upper side than to the lower side of a stepped face 70 formed in its axial center section. A stopper fitting 72 is bolted to the upper end face of the bracket 20, and a base fitting 74 is bolted to the lower end face.

The stopper fitting 72 has the shape of a large-diameter round cylinder with an outwardly spreading flange portion 76 at its lower opening. The flange portion 76 is juxtaposed against the upper end face of the bracket 20 and bolted to it. An abutting portion 78 is formed extending inward at the upper end opening of the stopper fitting 72. By then positioning the stopper portion 22 of the first mounting member 12 in abutment against the abutting portion 78 via the interposed cushioning rubber piece 44, the function of a stopper in the rebound direction is achieved. An umbrella-shaped protective member 80 mounted on the fastening shaft 24 of the first mounting member 12 extends so as to cover the upper end opening of the stopper fitting 72.

The base fitting 74 has the form of a bottomed round cylinder with a cylindrical portion of smaller inside diameter dimension than the bracket 20, with a mounting flange 82 formed extending outward from the lip of the opening. The mounting flange 82 is juxtaposed against the lower end face of the bracket 20 and bolted to it.

The second mounting member 14 which has been set in the bracket 20 is held clasped in the axial direction by the flange portion 76 of the stopper fitting 72 and the mounting flange 82 of the base fitting 74, and is secured so that it cannot become dislodged. A plurality of leg portions 84 project from the outside peripheral face of the bracket 20 and extend downward.

An electric motor 86 provided as the actuator is disposed on the base fitting 74. The electric motor 86 is an electrical motor of existing design furnished with a rotating shaft 88. In the present embodiment in particular, the direction of rotation of the rotating shaft 88 changes depending on the direction of current flow to the electric motor 86. The rotating shaft 88 of the electric motor 86 is provided with an external thread member 90 having a screw thread formed on its outside peripheral face.

The electric motor 86 is installed on the base fitting 74 by being secured fitting within a center hole of a support member 92 housed within the base fitting 74. In this state, the rotating shaft 88 of the electric motor 86 is positioned spaced apart to the inside peripheral side of a retainer cylinder 94 provided at the inside peripheral edge of the support member 92.

A control unit 98 is provided on the circuit electrically connecting the electric motor 86 with a power unit 96. The control unit 98 includes for example a sensor for detecting driving conditions of the automobile and a mechanical contact point control unit for changing the direction of current flow to the electric motor 86 according to the result of detection by the sensor. This control unit 98 functions to change the rotation direction of the rotating shaft 88 of the electric motor 86 according to conditions of the vehicle. The system is designed to detect the rotation angle of the rotating shaft 88 or the duration of energization of the electric motor 86, and to control current flow to the electric motor 86 according to the detected result in order to interrupt rotation of the rotating shaft 88 at a prescribed rotation quantity.

The sensor mentioned above may be a single sensor of known design such as an acceleration sensor, or one including a central processing unit such as an ECU (engine control unit). The sensor may be selected appropriately according to the vibration damping characteristics required of the engine mount 10.

Additionally, an internal thread portion 100 is connected to the distal end section of the rotating shaft 88 of the electric motor 86 so as to project towards the opening from the upper base wall portion 40 of the inside orifice member 36. This internal thread portion 100 is round cylindrical in shape and has a screw thread corresponding to the screw thread of the external thread member 90, formed along the entire length of its inside peripheral face.

The internal thread portion 100 is attached to the distal end section of the rotating shaft 88 by screwing the external thread member 90 provided to the rotating shaft 88 into this internal thread portion 100 from below. The inside orifice member 36 is thereby connected to the rotating shaft 88 of the electric motor 86 in the outside atmosphere.

In this state, the internal thread portion 100 is inserted into the retainer cylinder 94. Mating projections 102, 102 are provided at the lower end of the internal thread portion 100, and these mating projections 102, 102 are adapted to fit into mating notches 104, 104 formed in the retainer cylinder 94. Through interlocking action of the mating projections 102, 102 and the mating notches 104, 104 in the circumferential direction the internal thread portion 100 is detained in nonrotatable fashion in the circumferential direction relative to the retainer cylinder 94. The rotational drive force generated by the electric motor 86 when energized is thereby converted to reciprocating drive force by the screw mechanism composed of the external thread member 90 and the internal thread portion 100, and is transmitted to the inside orifice member 36. Through control of the rotation direction of the rotating shaft 88 of the electric motor 86, the inside orifice member 36 undergoes actuated displacement in the axial direction to a desired position so that the insertion distance of the inside orifice member 36 with respect to the outside orifice member 48 can be adjusted. The passage length: L of the orifice passage 68 varies as a result.

The automotive engine mount 10 constructed in this manner is installed with the first mounting member 12 of the mount assembly 18 mounted onto the power unit (not shown) through the fastening shaft 24, and the second mounting member 14 mounted onto the vehicle body (not shown) via the bracket 20. The engine mount 10 is thereby interposed between the power unit and the vehicle body to provide the power unit with vibration damping support on the vehicle body.

With the automotive engine mount 10 constructed in the above manner installed in the automobile, when the system experiences input of engine shake vibration which is a problem encountered during driving, pressure fluctuations arise in the first fluid chamber 58. Due to a differential in relative pressure fluctuations arising between the first fluid chamber 58 and the second fluid chamber 60, fluid flow is produced through the low-frequency orifice passage 64, and vibration damping based on flow action such as resonance action of the fluid (high attenuation) is produced to counter the engine shake vibration. Accordingly, during driving of the automobile, the tuning frequency of the orifice passage 68 is set to lower frequency than the tuning frequency of the low-frequency orifice passage 64. Fluid flow through the orifice passage 68 is thereby inhibited to ensure ample fluid flow through the low-frequency orifice passage 64. The low-frequency orifice passage 64 effectively produces vibration damping action as a result.

Also, with the vehicle at a stop, the tuning frequency of the orifice passage 68 is set such that the orifice passage 68 produces effective vibration damping of idling vibration. During input of idling vibration, which can be a problem under these conditions, the differential in terms of the relative pressure fluctuations arising between the first fluid chamber 58 and the second fluid chamber 60 gives rise to fluid flow through the orifice passage 68 to produce vibration damping of idling vibration based on flow action such as resonance action of the fluid (low dynamic spring).

In some instances the frequency of idling vibration may vary. For example, in an automatic transmission vehicle, the frequency of idling vibration differs between the Neutral and Drive ranges, and the frequency of idling vibration also differs when the air conditioning system is turned on versus when turned off. In the event of a change in the frequency of idling vibration, the rotating shaft 88 of the electric motor 86 is rotated on the basis of a control signal from the control unit 98, thereby changing the insertion distance of the inside orifice member 36 into the outside orifice member 48. The passage length of the orifice passage 68 is changed thereby, so that the tuning frequency of the orifice passage 68 changes. In the present embodiment, the tuning frequency of the orifice passage 68 is preset according to the cause of the change in idling vibration (e.g. on/off status of the air conditioning system, or shift position for an automatic transmission vehicle).

In the engine mount 10 constructed in the above manner, the tuning frequency of the orifice passage 68 is varied by varying the passage length of the orifice passage 68. Thus, even if the frequency of the vibration targeted for damping changes due to conditions of the vehicle, it is possible for the tuning frequency of the orifice passage 68 to track the change in frequency of the vibration targeted for damping. As a result, vibration damping action based on flow action such as resonance action of induced fluid flow through the orifice passage 68 may be effectively produced against the vibration targeted for damping.

In the process of changing the tuning frequency of the orifice passage 68, the diametrical distance between the opposed outside peripheral face of the inside orifice member 36 and the inside peripheral face of the outside orifice member 48, which is equivalent to the gap dimension of the cylindrical gap 66, remains substantially unchanged. In particular, tuning of the orifice passage 68 to a low frequency range can be accomplished by increasing the passage length of the orifice passage 68, while maintaining the cross sectional area of the orifice passage 68. It is accordingly possible to avoid situations of increased flow resistance caused by constriction of the cross sectional area of the orifice passage 68, so that the level of fluid flow through the orifice passage 68 may be maintained and the desired vibration damping based on flow action of the fluid may be consistently achieved.

Additionally, when the tuning frequency of the orifice passage 68 changes, because the gap dimension is maintained substantially unchanged as the passage length changes, it is possible to minimize fluid flow within the orifice passage 68 occurring during the operation to change the tuning frequency. Specifically, if the tuning frequency is changed by varying the gap dimension of the orifice passage 68, because the gap dimension (passage cross sectional area) changes along the entire length of the orifice passage 68, fluid flow arises along the entire length of the orifice passage 68. On the other hand, if the tuning frequency is changed by varying the passage length of the orifice passage 68, only the length at the end of the orifice passage changes, and fluid flow is produced only at the end of the orifice passage. For this reason, according to the engine mount 10 of the present embodiment which has been designed so that tuning frequency is changed by varying the passage length of the orifice passage 68, it is possible for the tuning frequency of the orifice passage 68 to be varied rapidly through displacement of the inside orifice member 36 at a low level of drive force.

Furthermore, the outside orifice member 48 and the inside orifice member 36 are assembled together with a prescribed gap extending all the way between their inside and outside peripheral faces, with the orifice passage 68 being defined by this gap. When varying the tuning frequency of the orifice passage 68, there is no direct sliding motion between the two members 36, 48 in association with the insertion/withdrawal displacement of the inside orifice member 36 with respect to the outside orifice member 48. Damage due to wear and problems with durability are thus avoided. Also, dimensional accuracy requirements for the outside orifice member 48 and the inside orifice member 36 are fairly low, so the procedure involved in manufacture and assembly of components is simpler.

Additionally, because the cylindrical gap 66 is utilized to define the orifice passage 68, even if the inside orifice member 36 and the outside orifice member 48 are not positioned concentrically due to dimensional error or the like, the cross sectional area of the orifice passage 68 can be maintained at the same size. Management and operations during manufacture of the engine mount 10 are easier as a result.

In the present embodiment, the inside orifice member 36 has a shape resembling an inverted cup, and the internal thread portion 100 which protrudes towards the opening from the upper base wall portion 40 thereof is utilized to attach the inside orifice member 36 to the rotating shaft 88 of the electric motor 86. It is possible thereby, while ensuring sufficient height dimension (axial length) on the part of the cylindrical wall portion 38 of the inside orifice member 36, to position the linking section between the inside orifice member 36 and the rotating shaft 88 of the electric motor 86 closer towards the main rubber elastic body 16 side than towards the electric motor 86 side. The axial dimension of the engine mount can be smaller as a result.

Further, according to the present embodiment, because the linking section between the inside orifice member 36 and the rotating shaft 88 of the electric motor 86 is situated in the outside atmosphere, there is no need to ensure sealing of the drive section. Manufacture of the engine mount 10 is simpler as a result, and it is possible to further improve the dependability and durability of operation of the inside orifice member 36.

Figure 2:
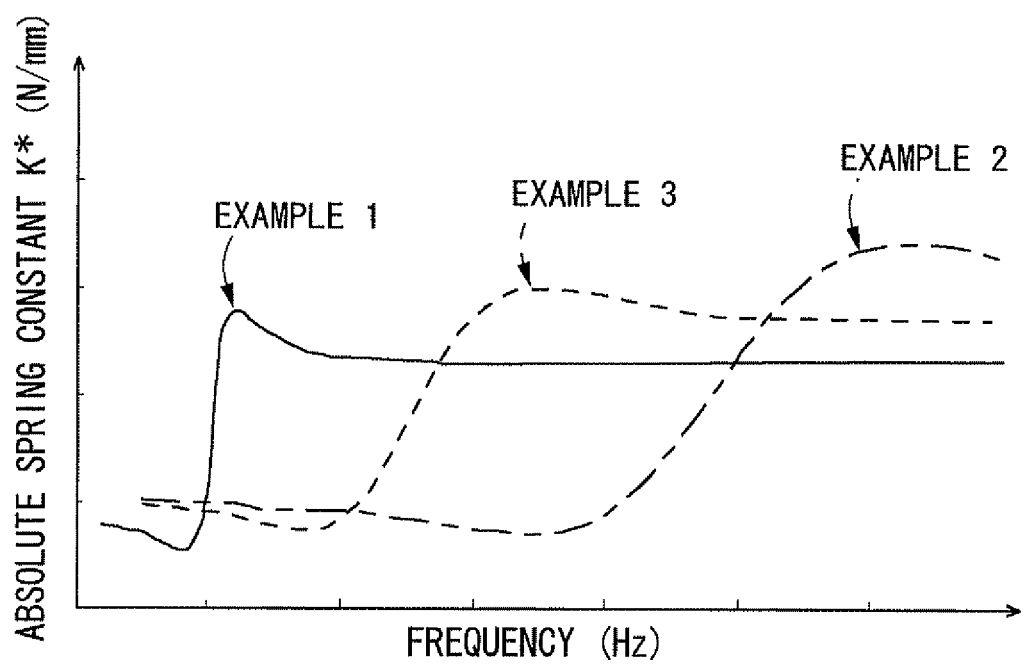
FIG. 2 is a graph showing vibration damping characteristics of the engine mount of FIG. 1.

FIG. 2 shows the results of simulation of vibration damping characteristics of orifice passage 68 of the engine mount 10. In FIG. 2, the frequency characteristics of absolute spring constant are plotted for the orifice passage 68 at maximum passage length (Example 1), the orifice passage 68 at minimum passage length (Example 2), and the orifice passage 68 at passage length between these extremes (Example 3). The passage length of the orifice passage 68 in Example 1 represents the greatest passage length of the orifice passage 68 when tuned to a higher frequency than the tuning frequency of the low-frequency orifice passage 64.

As will be appreciated from the simulation results presented in FIG. 2, the vibration damping action produced by the orifice passage 68 may be varied by varying the insertion distance of the inside orifice member 36 with respect to the outside orifice member 48 to change the passage length of the orifice passage 68. In particular, it will be appreciated that the zone of low dynamic spring produced on the basis of resonance action of fluid flowing through the orifice passage 68, and the extent of this zone, may be adjusted appropriately by varying the insertion distance of the inside orifice member 36 with respect to the outside orifice member 48.

Additionally, according to the engine mount 10 of the present embodiment, by switching the direction of current flow to the electric motor 86 in appropriate cycles, reciprocating motion of the inside orifice member 36 centered on an established insertion position can take place in such a way as to produce dynamic vibration damping through oscillatory driving of the inside orifice member 36.

In this case, the oscillatory driving member is composed of the electric motor 86. The inside orifice member 36 undergoes reciprocating motion towards both sides in the direction of insertion of the inside orifice member 36 into the outside orifice member 48, which is also the axial direction of the mount.

Switching of the direction of current flow to the electric motor 86 may be accomplished for example through feedback control such as adaptive control using the engine ignition signal of the power unit as a reference signal, and the vibration sensor signal for component targeted for damping (the vehicle body) as an error signal; or through map control on the basis of predetermined control data.

During input of idling vibration, which can be a problem when the vehicle is stopped, the inside orifice member 36 is subjected to oscillatory driving so as to produce low dynamic spring utilizing the pressure fluctuations of the first fluid chamber 58 that arise in association with idling vibration. Specifically, the inside orifice member 36 is subjected to oscillatory driving to a frequency approximately the same as that of idling vibration. Dynamic vibration damping is produced thereby, and vibration in the part targeted for damping (the vehicle body) can be effectively reduced.

Because the orifice passage 68 is tuned to the frequency range of idling vibration, during oscillatory driving of the inside orifice member 36 as described above, fluid flow is actively produced through the orifice passage 68. Thus, dynamic vibration damping action is produced in combination with pressure controlling action of the first fluid chamber 58 on the basis of fluid flow action through the orifice passage 68, so that vibration in the part targeted for damping (the vehicle body) can be reduced even more effectively.

If the frequency of idling vibration changes, the passage length of the orifice passage 68 is changed by driving rotation of the rotating shaft 88 of the electric motor 86 in order to vary the tuning frequency of the orifice passage 68. Under these conditions, the desired dynamic vibration damping action may be achieved in the desired frequency ranges through oscillation of the inside orifice member 36 as described above.

According to the engine mount 10 of the present embodiment, both adjustment of the insertion position of the inside orifice member 36 into the outside orifice member 48 and oscillatory driving of the inside orifice member 36 are accomplished utilizing the rotational drive force of the electric motor 86. Consequently, fewer parts are required for the engine mount 10, the structure of the engine mount 10 is simpler, and thus the manufacturing process of the engine mount 10 is easier.

Figure 3:
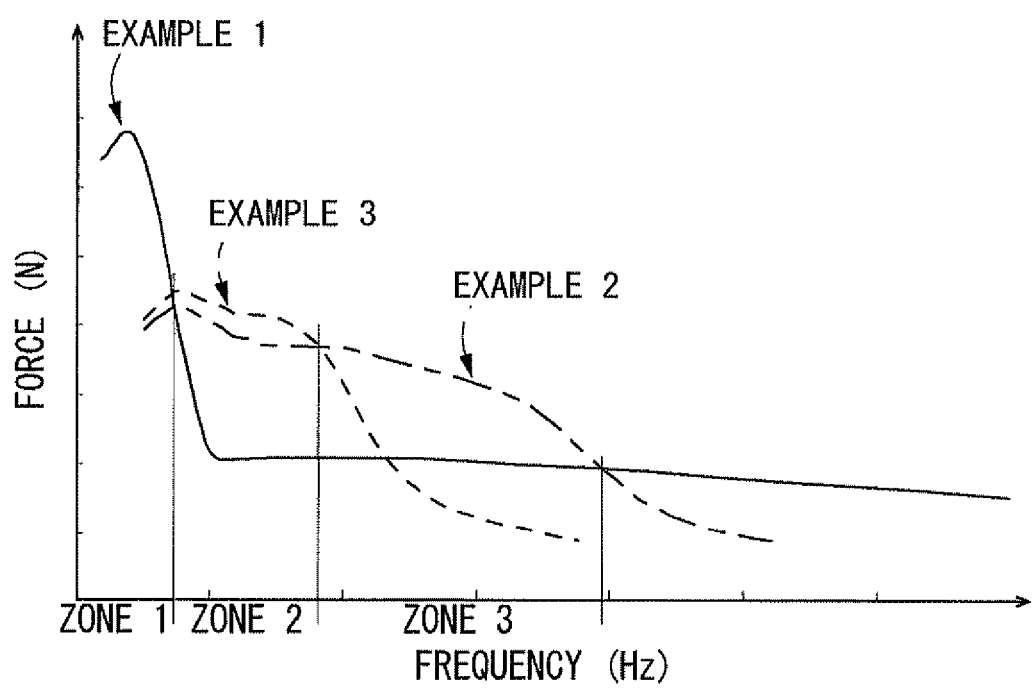
FIG. 3 is a graph showing vibration damping characteristics of the engine mount of FIG. 1.

FIG. 3 depicts the relationship between frequency and the transmission force of oscillating force exerted across the first mounting member 12 and the second mounting member 14 during oscillatory driving of the inside orifice member 36. In FIG. 3, the frequency characteristics of oscillating force are plotted for the orifice passage 68 at maximum passage length (Example 1), the orifice passage 68 at minimum passage length (Example 2), and the orifice passage 68 at passage length between these extremes (Example 3). The passage length of the orifice passage 68 in Example 1 represents the greatest passage length of the orifice passage 68 when tuned to a higher frequency than the tuning frequency of the low-frequency orifice passage 64.

As will be appreciated from the graph in FIG. 3, in Zone 1, transmission force is greatest in Example 1; in Zone 2, transmission force is greatest in Example 3; and in Zone 3, transmission force is greatest in Example 2. Accordingly it will be appreciated that by varying the passage length of the orifice passage 68 according to the zone in which the frequency of the vibration targeted for damping lies, it is possible to achieve greater transmission force, and hence more efficient dynamic vibration damping action.

Figure 4:
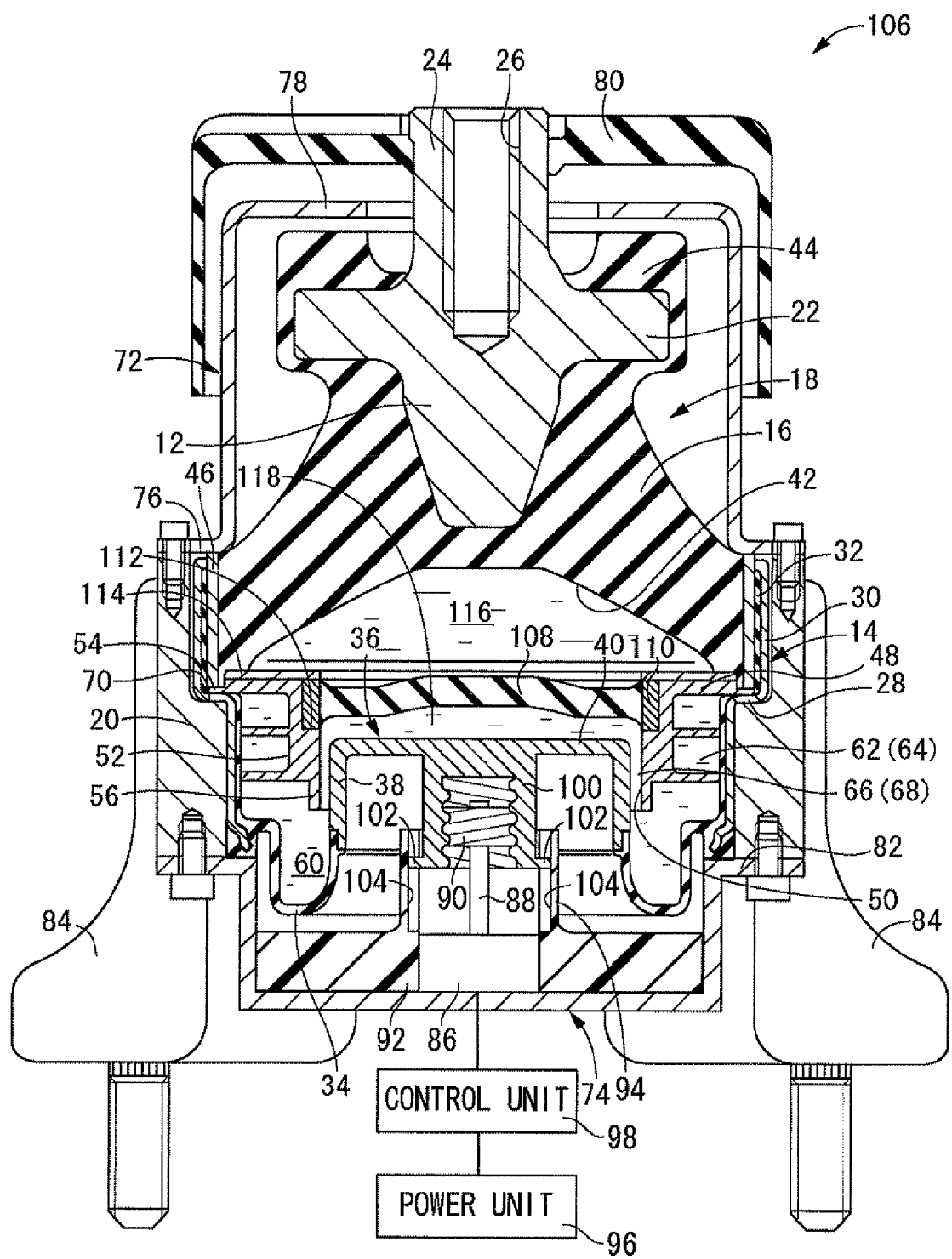
FIG. 4 a longitudinal cross sectional view of an engine mount according to a second embodiment of the present invention.

The description now turns to an engine mount 106 as a second embodiment of the fluid-filled type vibration damping device according to the present invention, making reference to FIG. 4. Components and parts appearing in the second embodiment below and in the third through eighth embodiments described subsequently and comparable in construction to those in the first embodiment have been assigned the same drawing symbols as in the first embodiment and are not discussed in detail.

The construction of the engine mount 106 of the present embodiment differs from that of the engine mount (10) of the first embodiment in that the opening at the axial upper end of the outside orifice member 48 (the side lying towards the main rubber elastic body 16) is covered by a moveable rubber film 108.

To describe in greater detail, the moveable rubber film 108 is disk shaped, and has a fitment ring 110 vulcanization bonded to its outside peripheral edge. Meanwhile, a stepped face 112 is formed on the inside peripheral face of the outside orifice member 48, which is larger in diameter to the upper side of this stepped face 112. The fitment ring 110 is slipped into the outside orifice member 48 from the opening at its axial upper end and is positioned resting on the stepped face 112 so that the moveable rubber film 108 fits within the outside orifice member 48 and extends in the axis-perpendicular direction to cover the opening at the axial upper end.

A presser plate fitting 114 of annular disk shape is juxtaposed against the upper face of the outside orifice member 48 and centered on the same axis with its outside peripheral edge clasped between the main rubber elastic body 16 and the outside orifice member 48. In this state, the inside peripheral edge part of the presser plate fitting 114 is juxtaposed against the upper face of the fitment ring 110, thereby preventing the fitment ring 110 from becoming dislodged.

Further, by arranging the moveable rubber film 108 as described above, the first fluid chamber (58) of the first embodiment, that is, the zone to the upper side of the outside orifice member 48 and the inside orifice member 36, is partitioned by the moveable rubber film 108. To the upper side of the moveable rubber film 108 there is thereby defined a primary fluid chamber 116 whose wall is partly constituted by the main rubber elastic body 16 and the moveable rubber film 108, and that gives rise to pressure fluctuations at times of vibration input. Meanwhile, to the lower side of the moveable rubber film 108 there is defined an auxiliary fluid chamber 118 whose wall is partly constituted by the moveable rubber film 108 and the upper base wall portion 40 of the inside orifice member 36, to which pressure fluctuations of the primary fluid chamber 116 are transmitted based on elastic deformation of the moveable rubber film 108. That is, according to the present embodiment, the primary fluid chamber 116 and the auxiliary fluid chamber 118 constitute the first fluid chamber. Also, in the present embodiment, the orifice passage 68 is designed to connect the auxiliary fluid chamber 118 and the second fluid chamber 60 to one another. The primary fluid chamber 116 and the second fluid chamber 60 are connected to one another by the low-frequency orifice passage 64.

Figure 5:
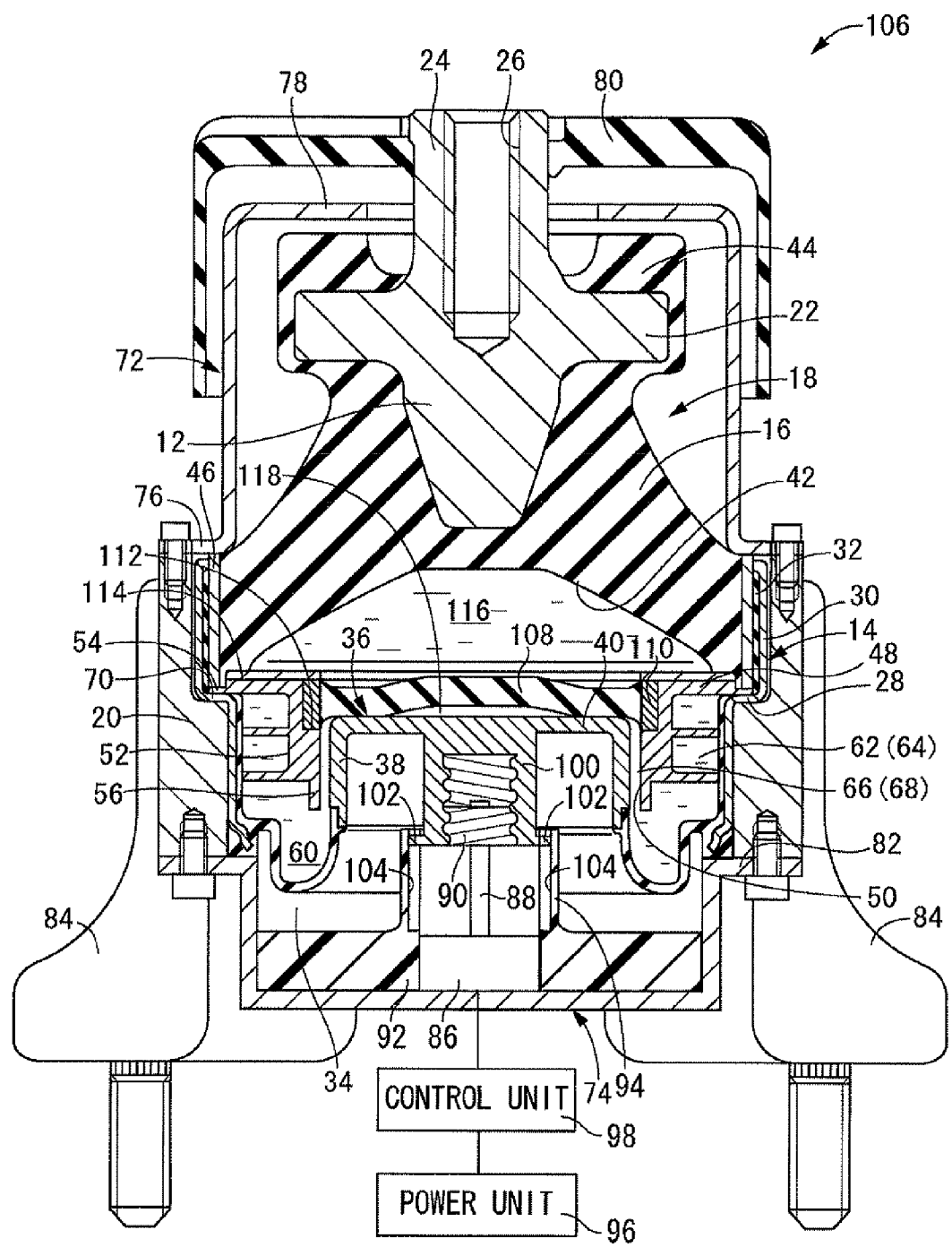
FIG. 5 is a longitudinal cross sectional view of the engine mount of FIG. 4, shown with the moveable rubber film in a constrained state.

According to the engine mount 106 constructed in the above manner, during input of engine shake vibration, vibration damping is produced on the basis of flow action such as resonance action of fluid flowing through the low-frequency orifice passage 64. In the present embodiment in particular, because the orifice passage 68 connects the auxiliary fluid chamber 118 with the second fluid chamber 60, ample fluid flow through the low-frequency orifice passage 64 is assured owing to the film rigidity of the moveable rubber film 108, thereby affording improved vibration damping by the low-frequency orifice passage 64. As depicted in FIG. 5, in the present embodiment the inside orifice member 36 may be positioned abutting the lower end face of the moveable rubber film 108. Where the moveable rubber film 108 is constrained in this manner, it is possible to better ensure ample fluid flow through the low-frequency orifice passage 64 to further improve vibration damping by the low-frequency orifice passage 64. By providing the moveable rubber film 108 as taught in the present embodiment, transmission of pressure from the primary fluid chamber 116 to the auxiliary fluid chamber 118 may be limited, even when the inside orifice member 36 is not positioned abutting the moveable rubber film 108.

Meanwhile, with the vehicle at a stop, the orifice passage 68 is tuned such that the orifice passage 68 produces effective vibration damping of idling vibration. During input of idling vibration, pressure fluctuations of the primary fluid chamber 116 are transmitted to the auxiliary fluid chamber 118 on the basis of elastic deformation of the moveable rubber film 108, thus giving rise to fluid flow through the orifice passage 68 between the auxiliary fluid chamber 118 and the second fluid chamber 60. Vibration damping action is thereby produced on the basis of flow action such as resonance action of fluid flowing through the orifice passage 68. In the present embodiment in particular, improved vibration damping by the orifice passage 68 may be attained by utilizing elastic resonance of the moveable rubber film 108 to boost the flow of fluid through the orifice passage 68. In the event that the frequency of idling vibration changes, the rotating shaft 88 of the electric motor 86 is rotated on the basis of a control signal from the control unit 98, thereby changing the passage length of the orifice passage 68 so that the tuning frequency of the orifice passage 68 can be varied.

The engine mount 106 of the present embodiment likewise affords dynamic vibration damping. Specifically, dynamic vibration damping may be achieved by pressure control of the primary fluid chamber 116 through the agency of the auxiliary fluid chamber 118 and the moveable rubber film 108, through oscillatory driving of the inside orifice member 36 while separated from the moveable rubber film 108.

Where the orifice passage 68 is tuned to the frequency range of idling vibration so as to produce effective vibration damping of idling vibration, by matching the oscillation frequency with the frequency of idling vibration during oscillatory driving of the inside orifice member 36 as described above, fluid flow can be actively generated through the orifice passage 68. Dynamic vibration damping action may be further improved as a result.

In the present embodiment, pressure transmission efficiency between the auxiliary fluid chamber 118 and the primary fluid chamber 116 can be increased through utilization of elastic resonance of the moveable rubber film 108. Dynamic vibration damping action may thus be produced more efficiently.

Dynamic vibration damping action may be achieved even with the inside orifice member 36 subjected to oscillatory driving while positioned abutting the moveable rubber film 108.

In the event that the frequency of idling vibration changes, the rotating shaft 88 of the electric motor 86 is rotated to change the passage length of the orifice passage 68 and vary the tuning frequency of the orifice passage 68. In this state, through oscillatory driving of the inside orifice member 36, the desired dynamic vibration damping action may be attained in the desired frequency ranges.

Figure 6:
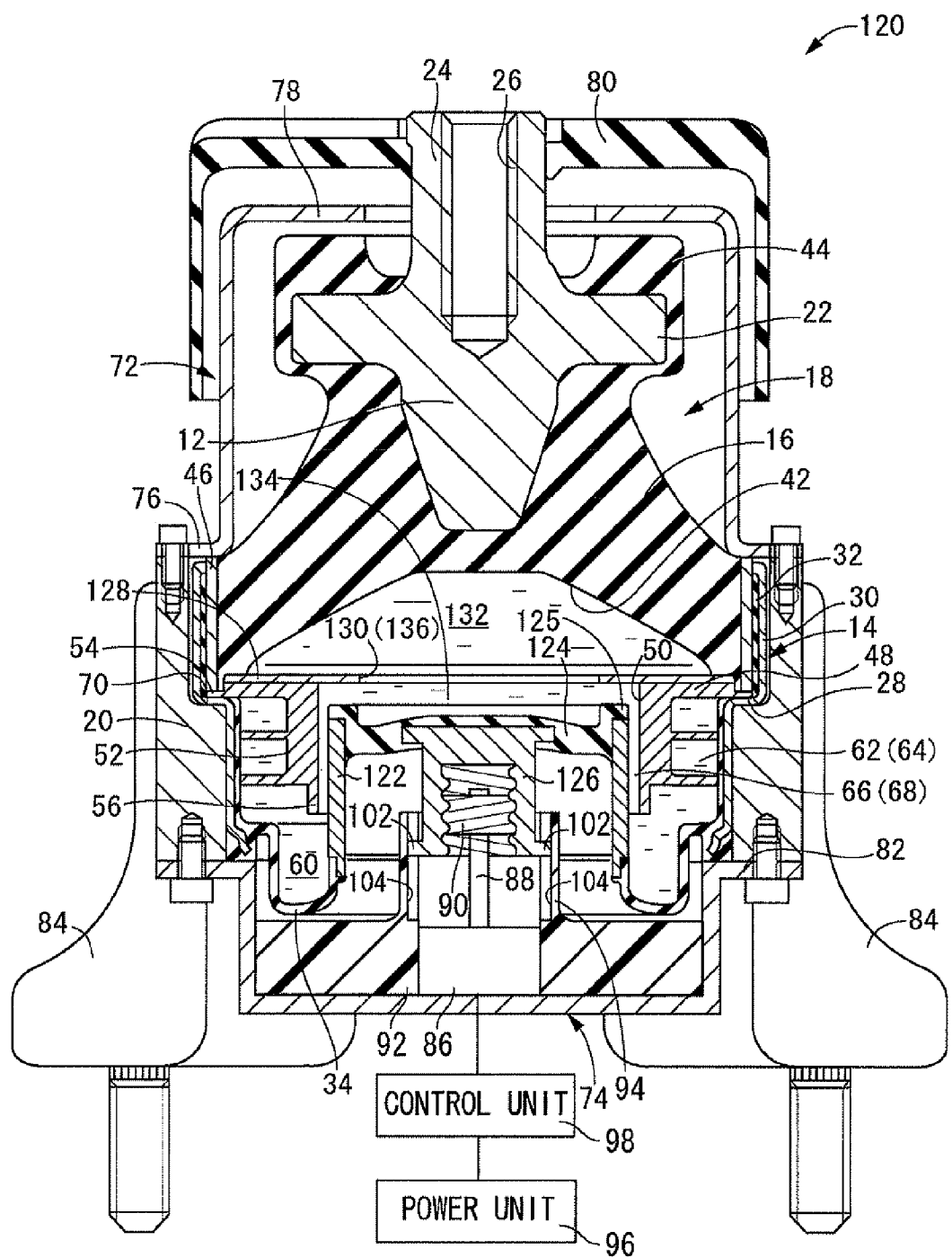
FIG. 6 is a longitudinal cross sectional view of an engine mount according to a third embodiment of the present invention.

The description now turns to an engine mount 120 as a third embodiment of the fluid-filled type vibration damping device according to the present invention, making reference to FIG. 6. The engine mount 120 of the present embodiment differs from the engine mount (10) of the first embodiment in terms of the design of the inside orifice member 122.

Figure 7:
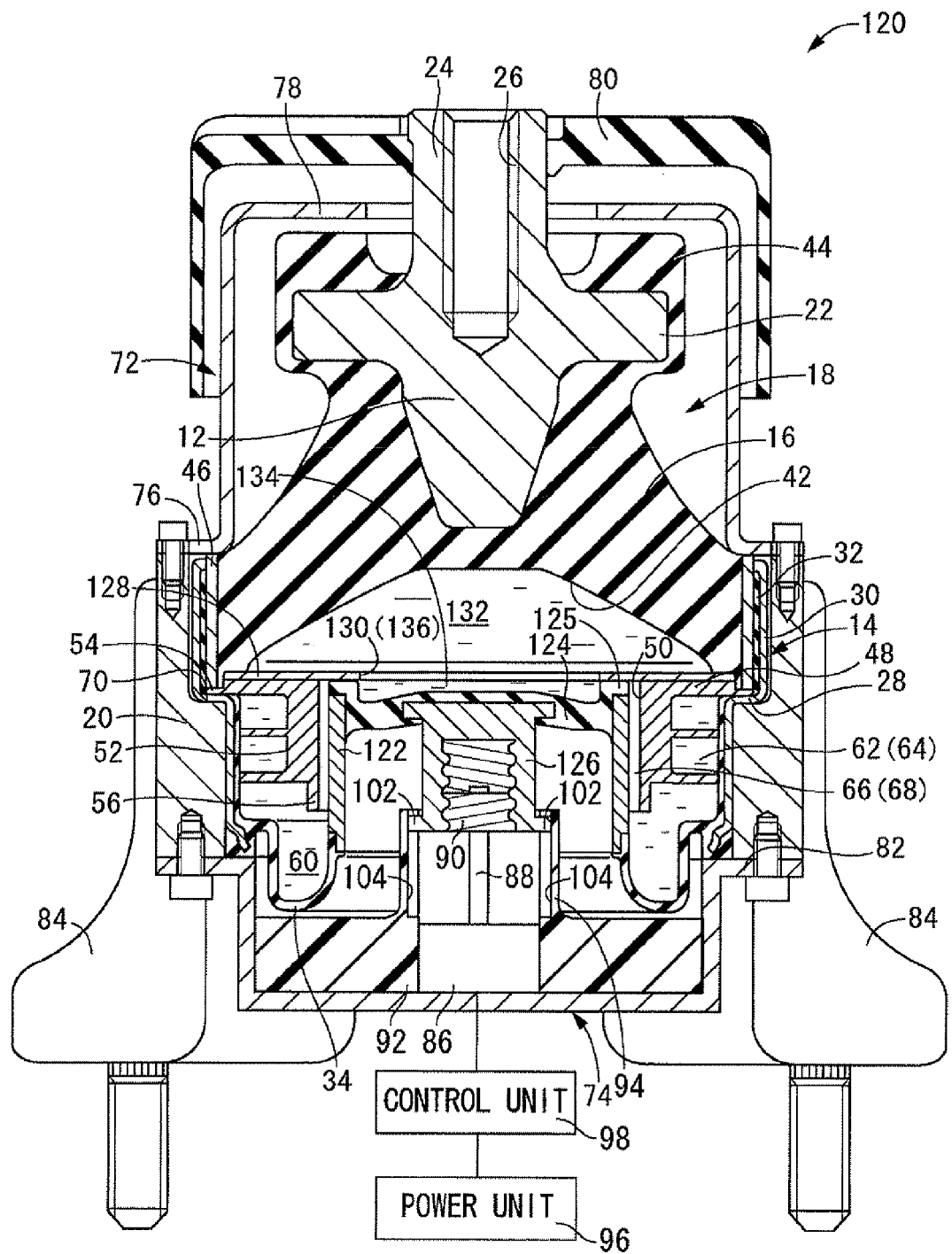
FIG. 7 is a longitudinal cross sectional view of the engine mount of FIG. 6, shown with the supporting rubber film in abutment with the partition plate fitting.

Turning to a more detailed description, the inside orifice member 122 of the present embodiment is made of metal and has round cylindrical shape extending on a straight path with substantially unchanging inside and outside diameter dimensions. The outside peripheral edge of a supporting rubber film 124 of circular disk shape is vulcanization bonded to the axial upper end of the inside orifice member 122. The opening at the axial upper end of the inside orifice member 122 is thereby covered fluidtightly by the supporting rubber film 124. In the present embodiment, the supporting rubber film 124 is vulcanization bonded at its outside peripheral edge to the upper end face of the inside orifice member 122. An elastic abutting projection 125 is thereby formed projecting axially outward from the upper end face of the inside orifice member 122. As depicted in FIG. 7, when an internal thread member 126 is displaced axially upward, this elastic abutting projection 125 becomes positioned abutting the inside peripheral edge part of a partition plate fitting 128. The internal thread member 126 is anchored to the center section of the supporting rubber film 124.

The internal thread member 126 is made of metal, and has inverted bottomed cylindrical shape overall. A screw thread corresponding to the screw thread of the external thread member 90 is provided on the inside peripheral face of the cylindrical wall portion of the internal thread member 126. Additionally, mating projections 102, 102 are provided on the outside peripheral face of the internal thread member 126.

This internal thread member 126 is positioned concentrically with the inside orifice member 122, and with its upper base wall portion embedded in the supporting rubber film 124 is vulcanization bonded therewith. In this state, the internal thread member 126 is disposed within the inside orifice member 122 so as to project axially upward.

The external thread member 90 is then screwed into the internal thread member 126 to mount the internal thread member 126 onto the distal end section of the rotating shaft 88 of the electric motor 86. The inside orifice member 122 is thereby elastically supported by the supporting rubber film 124, on the rotating shaft 88 of the electric motor 86. The inside orifice member 122 is disposed inserted into the passage hole 50 of the outside orifice member 48 through the opening at the axial lower end. The tunable frequency range of the orifice passage 68 is the same as in the first embodiment.

The partition plate fitting 128, which is shaped like an annular disk, is juxtaposed against the upper face of the outside orifice member 48 and centered on the same axis therewith, with its outside peripheral edge clasped between the main rubber elastic body 16 and the outside orifice member 48. According to the present embodiment, the inside diameter dimension of a center hole 130 of the partition plate fitting 128 is smaller than the inside diameter dimension of the passage hole 50 of the outside orifice member 48. Thus, the first fluid chamber (58) of the first embodiment, i.e. the zone to the upper side of the inside orifice member 122 and the outside orifice member 48, is partitioned into upper and lower parts by the partition plate fitting 128. As a result, to the upper side of the partition plate fitting 128 there is defined a primary fluid chamber 132 whose wall is partly constituted by the main rubber elastic body 16 and the moveable rubber film 108, and adapted to give rise to pressure fluctuations at times of vibration input. Meanwhile, to the lower side of the partition plate fitting 128 there is defined an auxiliary fluid chamber 134 whose wall is partly constituted by the supporting rubber film 124. That is, according to the present embodiment, the primary fluid chamber 132 and the auxiliary fluid chamber 134 constitute the first fluid chamber. Also, in the present embodiment, the primary fluid chamber 132 and the auxiliary fluid chamber 134 communicate with each other through a high-frequency orifice passage 136 defined by the center hole 130 of the partition plate fitting 128. According to the present embodiment, the high-frequency orifice passage 136 is tuned to a high frequency range such as driving rumble. Through the orifice passage 68, the auxiliary fluid chamber 134 connects to a second fluid chamber 60 provided as the second fluid chamber. The primary fluid chamber 132 connects to the second fluid chamber 60 through the low-frequency orifice passage 64.

According to the engine mount 120 constructed in the above manner, during driving, the tuning frequency of the orifice passage 68 is set to lower frequency than the tuning frequency of the low-frequency orifice passage 64. Thus, fluid flow does not occur through the orifice passage 68 so that ample fluid flow through the low-frequency orifice passage 64 may be assured. As a result, during input of engine shake vibration, vibration damping action is produced effectively on the basis of flow action such as resonance action of fluid flowing through the low-frequency orifice passage 64.

Meanwhile, with the vehicle at a stop, the tuning frequency of the orifice passage 68 is set to the frequency of idling vibration so that the orifice passage 68 produces effective vibration damping of idling vibration. During input of idling vibration, pressure fluctuations of the primary fluid chamber 132 are transmitted to the auxiliary fluid chamber 134 through the high-frequency orifice passage 136. Fluid flow is thereby produced through the orifice passage 68 between the auxiliary fluid chamber 134 and the second fluid chamber 60. As a result, vibration damping of idling vibration is produced effectively on the basis of flow action such as resonance action of fluid flowing through the orifice passage 68. In the present embodiment in particular, by utilizing elastic resonance of the supporting rubber film 124 to boost the flow of fluid through the orifice passage 68, it is possible to attain improved vibration damping on the part of the orifice passage 68. In the event that the frequency of idling vibration changes, the rotating shaft 88 of the electric motor 86 is rotated on the basis of a control signal from the control unit 98, thereby changing the passage length of the orifice passage 68 so that the tuning frequency of the orifice passage 68 can be varied.

Further, according to the present embodiment, during input of vibration in a high-frequency range such as driving rumble, fluid flow takes place through the high-frequency orifice passage 136 between the primary fluid chamber 132 and the auxiliary fluid chamber 134. Vibration damping of vibration in a high-frequency range such as driving rumble is thereby produced effectively on the basis of flow action such as resonance action of fluid flowing through the high-frequency orifice passage 136.

As depicted in FIG. 7, the supporting rubber film 124 may be positioned with its outside peripheral edge abutting the inside peripheral edge of the partition plate fitting 128, and with the outside peripheral edge clasped between the partition plate fitting 128 and the inside orifice member 122. In this case, the orifice passage 68 is blocked. It is possible thereby to ensure ample fluid flow through the low-frequency orifice passage 64. As a result, vibration damping may be effectively produced on the basis of flow action of fluid through the low-frequency orifice passage 64. During input of vibration in a high-frequency range such as driving rumble, vibration damping is produced on the basis of flow action such as resonance action of fluid flowing through the high-frequency orifice passage 136.

The engine mount 120 of the present embodiment likewise affords dynamic vibration damping. Specifically, because the primary fluid chamber 132 and the auxiliary fluid chamber 134 act as the first fluid chamber during input of idling vibration, dynamic vibration damping may be achieved through oscillating of the supporting rubber film 124 by the internal thread member 126.

In the present embodiment in particular, with the vehicle at a stop the tuning frequency of the orifice passage 68 is set to the frequency of idling vibration so as to produce effective vibration damping of idling vibration, whereby an effect comparable to that in the first and second embodiments may be attained during oscillation of the supporting rubber film 124 as described above.

In the present embodiment, the oscillation efficiency of the supporting rubber film 124 can be improved by utilizing the elastic resonance of the supporting rubber film 124. Consequently, dynamic vibration damping action can be produced more efficiently.

Furthermore, according to the present embodiment, oscillation of the internal thread member 126 results substantially in oscillation of the supporting rubber film 124 only, thereby minimizing or avoiding oscillation of the inside orifice member 122. The load on the electric motor 86 during dynamic vibration damping through oscillation is reduced thereby.

In the event that the frequency of idling vibration changes, the rotating shaft 88 of the electric motor 86 is rotated to change the passage length of the orifice passage 68 and vary the tuning frequency of the orifice passage 68. In this state, through oscillation of the supporting rubber film 124 as described above, the desired dynamic vibration damping action may be achieved in the desired frequency ranges.

Where oscillation of the supporting rubber film 124 corresponds to vibration of a high-frequency range such as driving rumble, it is possible to efficiently transmit internal pressure fluctuations arising in the auxiliary fluid chamber 134 to the primary fluid chamber 132 by utilizing the resonance action of fluid flowing through the high-frequency orifice passage 136, so as to control pressure in the primary fluid chamber 132. As a result, dynamic vibration damping can be produced efficiently against vibration of a high-frequency range such as driving rumble as well.

Further, as depicted in FIG. 7, the supporting rubber film 124 may be positioned with its inside peripheral edge abutting the inside peripheral edge of the partition plate fitting 128, and with the outside peripheral edge of the supporting rubber film 124 clasped between the partition plate fitting 128 and the inside orifice member 122, thereby blocking the orifice passage 68. Under these conditions it is possible to ensure greater fluid flow through the low-frequency orifice passage 64. Furthermore, by inducing oscillation of the supporting rubber film 124, dynamic vibration damping of idling vibration, driving rumble, or similar vibration of a high-frequency range is obtained. In particular, dynamic vibration damping of vibration of a high-frequency range such as driving rumble may be produced efficiently by utilizing the resonance action of fluid flowing through the high-frequency orifice passage 136.

Figure 8:
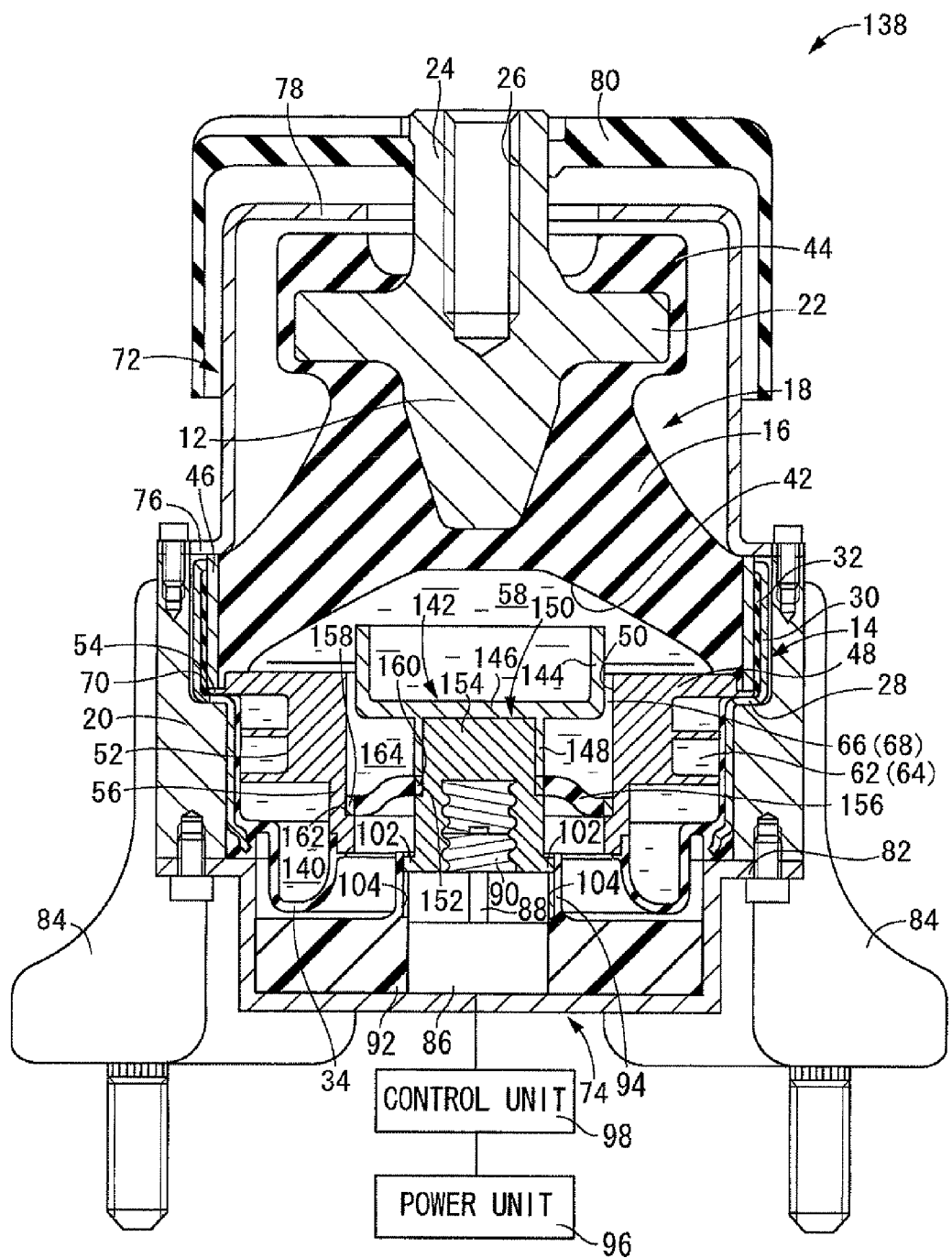
FIG. 8 is a longitudinal cross sectional view of an engine mount according to a fourth embodiment of the present invention.

The description turns next to an engine mount 138 as a fourth embodiment of the fluid-filled type vibration damping device according to the present invention, making reference to FIG. 8. The engine mount 138 of the present embodiment differs from that of the engine mount (10) of the first embodiment in that the inside peripheral edge of the diaphragm 34 is vulcanization bonded to the tubular extended wall portion 56 of the outside orifice member 48. To the lower side of the outside orifice member 48 there is thereby defined a first equilibrium chamber 140 whose wall is partially constituted by the diaphragm 34 and adapted to readily permit changes in volume. That is, according to the present embodiment, the first fluid chamber 58 and the first equilibrium chamber 140 are connected by the low-frequency orifice passage 64, and the second fluid chamber is constituted by the first equilibrium chamber 140.

The construction of the inside orifice member 142 in the present embodiment differs as well. The inside orifice member 142 of the present embodiment is made of metal, and has the shape of a bottomed round cylinder with a base wall portion 146 and a cylindrical wall portion 144 that extends on a straight path with substantially unchanging inside and outside diameter dimensions. The base wall portion 146 of the inside orifice member 142 is provided with a connecting cylindrical portion 148 that protrudes out to the opposite side from the cylindrical wall portion 144 and has smaller inside and outside diameter dimensions than the cylindrical wall portion 144. An internal thread member 150 is attached to this connecting cylindrical portion 148.

The internal thread member 150 is made of metal, and has inverted bottomed cylindrical shape overall; a screw thread corresponding to the screw thread of the external thread member 90 is provided on the inside peripheral face of the cylindrical wall. On the outside peripheral face of the internal thread member 150, a stepped face 152 is formed in the axial center section, with the section above the stepped face 152 constituting a small-diameter portion 154. Mating projections 102, 102 are provided on the outside peripheral face of the internal thread member 150.

This internal thread member 150 is attached by pressure fitting the small-diameter portion 154 into the connecting cylindrical portion 148. The inside orifice member 142 and the internal thread member 150 are connected thereby. The external thread member 90 is screwed into the internal thread member 150. The internal thread member 150 is thereby attached to the distal end section of the rotating shaft 88 of the electric motor 86. As a result, rotational drive force of the electric motor 86 may be transmitted to the inside orifice member 142. The inside orifice member 142 is disposed inserted into the outside orifice member 48 from the opening at the axial upper side. In the present embodiment, the tunable frequency range of the orifice passage 68 is the same as in the first embodiment.

A flexible rubber film 156 is arranged within the passage hole 50 of the outside orifice member 48. This flexible rubber film 156 has the form of an annular disk, with an outer ring fitting 158 vulcanization bonded to its outside peripheral edge and an inner ring fitting 160 vulcanization bonded to its inside peripheral edge. The inner ring fitting 160 is slipped about the outside of the small-diameter portion 154 of the internal thread member 150 and is clasped between the stepped face 152 of the internal thread member 150 and the projecting distal end face of the connecting cylindrical portion. 148, while the outer ring fitting 158 is pressure fit into the passage hole 50 of the outside orifice member 48 and juxtaposed against a stepped face 162 formed on the inside peripheral face of the outside orifice member 48, so that the interior of the passage hole 50 of the outside orifice member 48 is partitioned fluidtightly into upper and lower parts by the flexible rubber film 156. There is thereby defined within the passage hole 50 of the outside orifice member 48 a second equilibrium chamber 164 whose wall is partially constituted by the flexible rubber film 156, and adapted to readily permit changes in volume. That is, the second equilibrium chamber 164 is formed independently of the first equilibrium chamber 140. The first fluid chamber 58 and the second equilibrium chamber 164 are connected to one another by the orifice passage 68. That is, according to the present embodiment, the second fluid chamber is constituted by the second equilibrium chamber 164.

When driving, the tuning frequency of the orifice passage 68 in the engine mount 138 constructed in this manner is set to lower frequency than the tuning frequency of the low-frequency orifice passage 64. Thus, fluid flow does not arise through the orifice passage 68 so that ample fluid flow through the low-frequency orifice passage 64 is assured. As a result, when engine shake vibration is input, vibration damping action is effectively produced on the basis of flow action such as resonance action of fluid flowing through the low-frequency orifice passage 64.

With the vehicle at a stop on the other hand, the tuning frequency of the orifice passage 68 is tuned to the frequency of idling vibration so that the orifice passage 68 produces effective vibration damping of idling vibration. During input of idling vibration, fluid flow is produced through the orifice passage 68. Thus, effective vibration damping action of idling vibration is produced on the basis of flow action such as resonance action of fluid flowing through the orifice passage 68. If the frequency of idling vibration changes, the passage length of the orifice passage 68 is changed by driving rotation of the rotating shaft 88 of the electric motor 86 on the basis of a control signal from the control unit 98, in order to vary the tuning frequency of the orifice passage 68.

According to the present embodiment, the first equilibrium chamber 140 and the second equilibrium chamber 164 are formed independently of one another, making it possible to independently set the film rigidity of the diaphragm 34 that constitutes the wall of the first equilibrium chamber 140 and the film rigidity of the flexible rubber film 156 that constitutes the wall of the second equilibrium chamber 164. A high degree of freedom in tuning the orifice passages 64, 68 is afforded thereby.

The engine mount 138 of the present embodiment likewise affords dynamic vibration damping. Specifically, during input of idling vibration which is a problem with the vehicle at a stop, dynamic vibration damping may be achieved through oscillatory driving of the inside orifice member 142.

Because the orifice passage 68 is tuned to the frequency range of idling vibration, during oscillatory driving of the inside orifice member 142 as described above, fluid flow is actively produced through the orifice passage 68. Dynamic vibration damping action takes place more efficiently as a result.

If the frequency of idling vibration changes, the passage length of the orifice passage 68 is changed by rotating the rotating shaft 88 of the electric motor 86 in order to vary the tuning frequency of the orifice passage 68. Under these conditions, oscillatory driving of the inside orifice member 142 as described above affords the desired dynamic vibration damping action in the desired frequency ranges.

Figure 9:
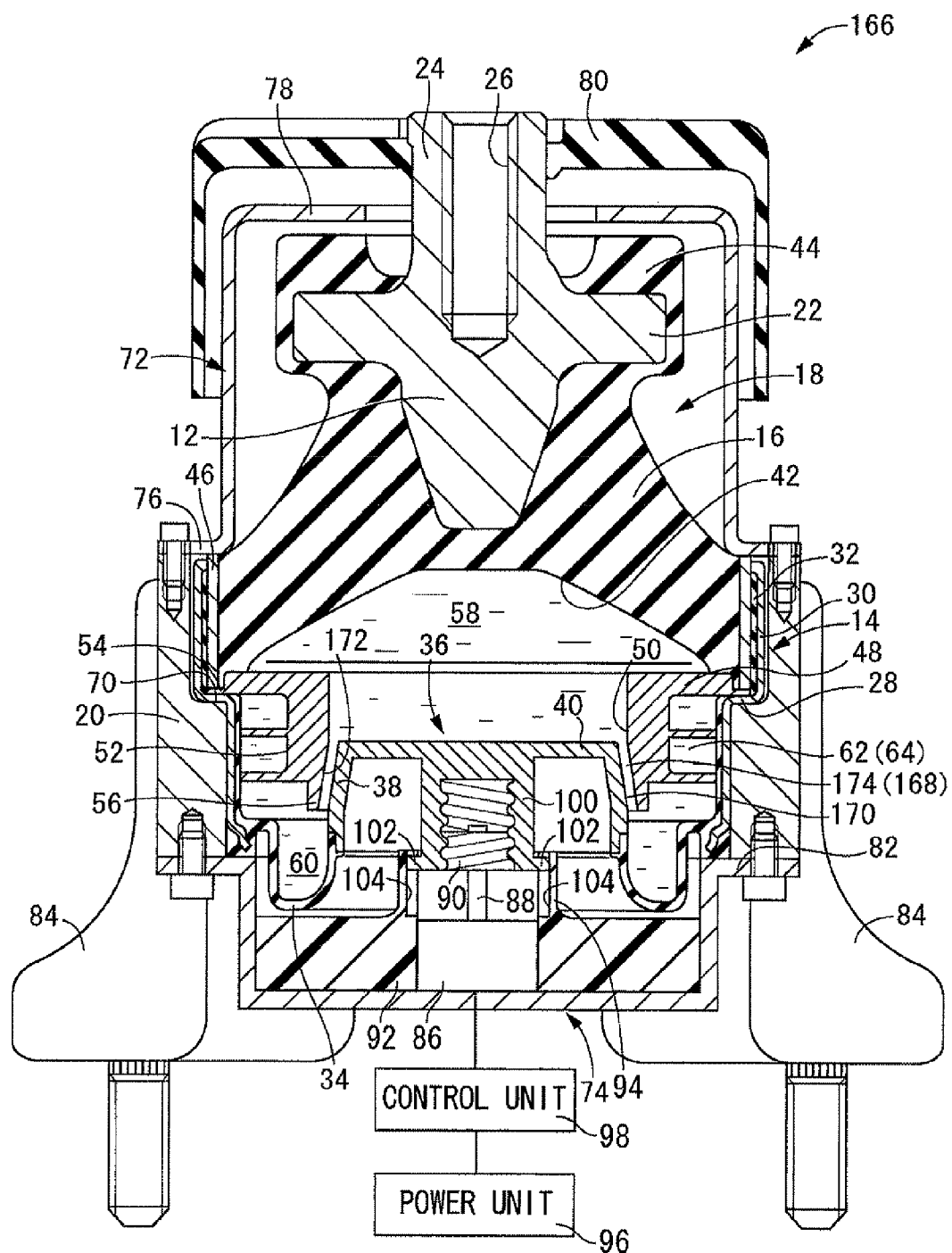
FIG. 9 is a longitudinal cross sectional view of an engine mount according to a fifth embodiment of the present invention.

The description now turns to an engine mount 166 as a fifth embodiment of the fluid-filled type vibration damping device according to the present invention, making reference to FIG. 9. The engine mount 166 of the present embodiment differs from the engine mount (10) of the first embodiment in terms of the shape of the orifice passage 168.

To describe in more detail, a tapered outside peripheral face 170 that progressively flares outward going from top to the bottom in the axial direction is formed on the outside peripheral face of the inside orifice member 36. A tapered inside peripheral face 172 that progressively flares outward going from top to the bottom in the axial direction is formed on the inside peripheral face of the outside orifice member 48 and has a slope angle corresponding to that of the tapered outside peripheral face 170. Specifically, a cylindrical gap 174 of tapered cylindrical shape of substantially unchanging inside and outside diameter dimensions and progressively flaring outward going from the top to the bottom in the axial direction is formed between the tapered outside peripheral face 170 and the tapered inside peripheral face 172. This cylindrical gap 174 of tapered cylindrical shape is utilized to form the orifice passage 168 connecting the first fluid chamber 58 and the second fluid chamber 60 to one another. The tunable frequency of the orifice passage 168 is set to one identical to that of the orifice passage (68) of the first embodiment.

In the engine mount 166 constructed in this way, because the orifice passage 168 is formed utilizing the cylindrical gap 174 of tapered cylindrical shape, by varying the insertion distance of the inside orifice member 36 into the outside orifice member 48 it is possible to vary not only the passage length of the orifice passage 168, but also the passage cross sectional area. It is accordingly possible to vary the tuning frequency of the orifice passage 168 over a wide band. Effective vibration damping of a wider frequency range of vibration is possible as a result.

Figure 10:
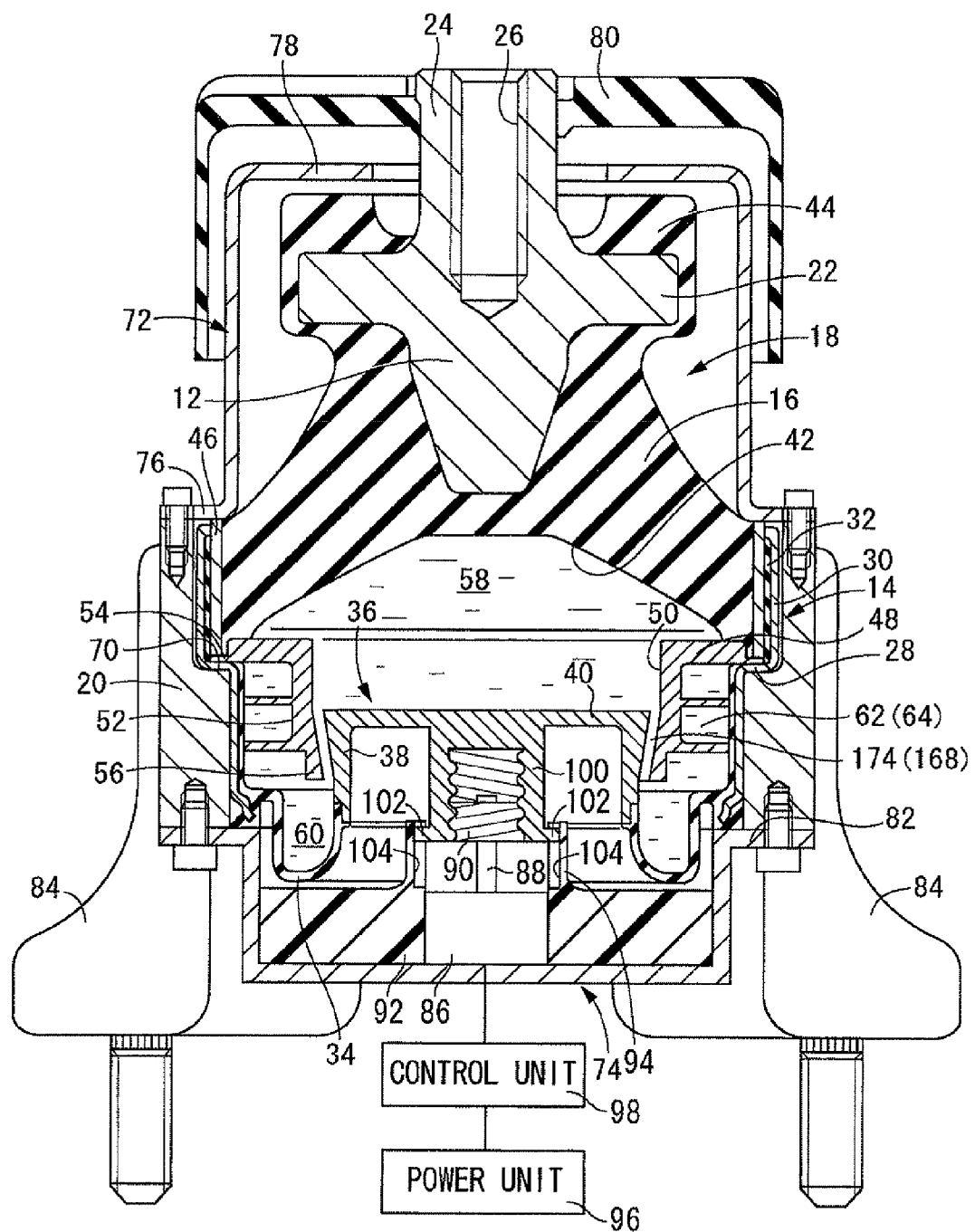
FIG. 10 is a longitudinal cross sectional view of another arrangement for the orifice passage employable in the fifth embodiment.

In the present embodiment, the cylindrical gap 174 has tapered cylindrical shape progressively smaller in diameter towards the top in the axial direction; however, the cylindrical gap 174 could instead have tapered cylindrical shape progressively smaller in diameter towards the bottom in the axial direction, as depicted in FIG. 10 for example.

Figure 11:
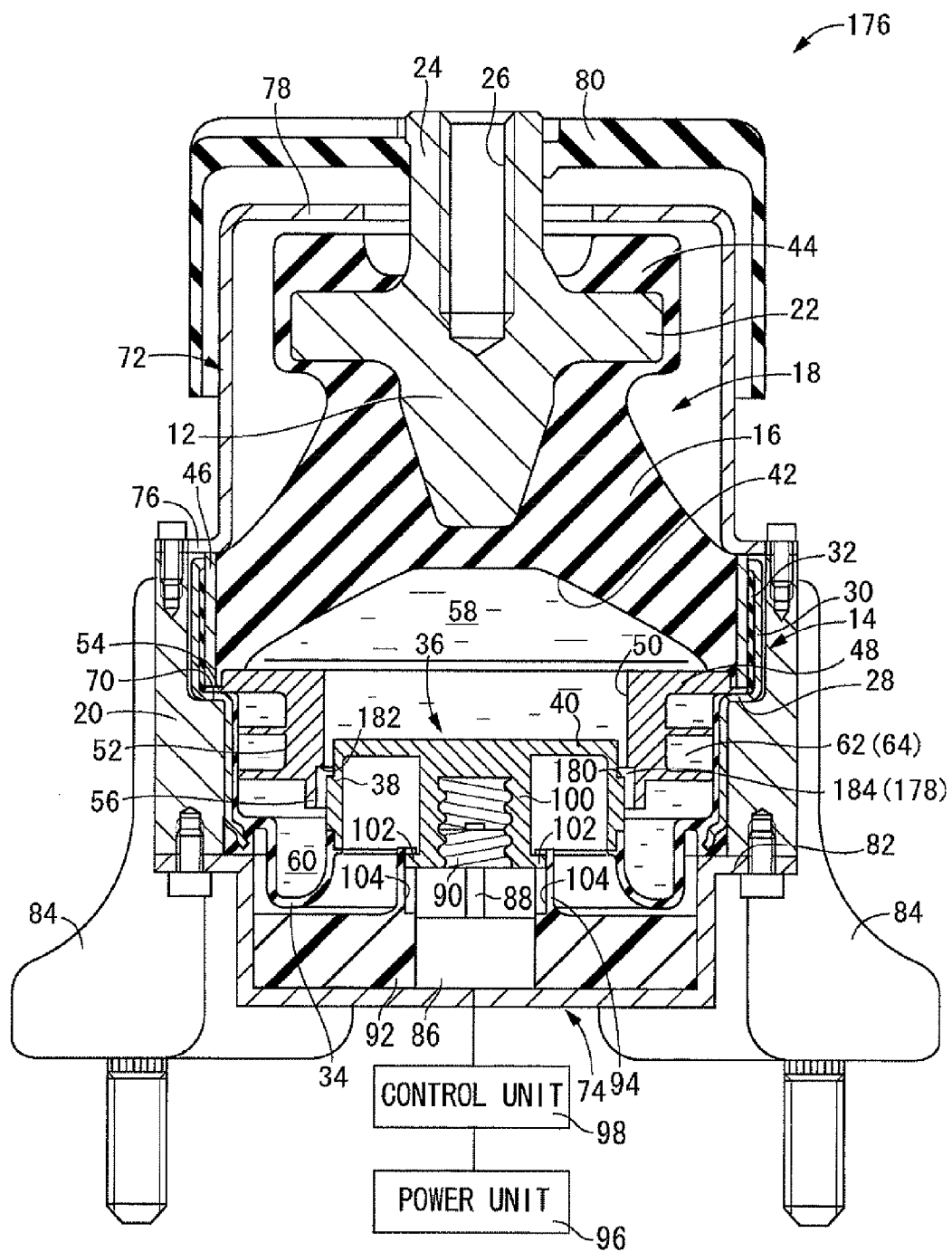
FIG. 11 is a longitudinal cross sectional view of an engine mount according to a sixth embodiment of the present invention.

The description next turns to an engine mount 176 as a sixth embodiment of the fluid-filled type vibration damping device according to the present invention, making reference to FIG. 11. The engine mount 176 of the present embodiment differs from the engine mount (10) of the first embodiment in terms of the shape of the orifice passage 178.

To describe in more detail, a stepped face 180 is formed on the outside peripheral face of the inside orifice member 36, giving it smaller diameter to the upper side of the stepped face 180 than to the lower side. A stepped face 182 is formed on the inside peripheral face of the outside orifice member 48 as well, giving it larger diameter to the lower side of the stepped face 182 than to the upper side. That is, the cylindrical gap 184 constituting the orifice passage 178 in the present embodiment has stepped round cylindrical shape. In the present embodiment, the tunable frequency of the orifice passage 178 is the same as that of the orifice passage (68) of the first embodiment.

In the engine mount 176 constructed in this way, because the cylindrical gap 184 has stepped cylindrical shape, by varying the insertion distance of the inside orifice member 36 into the outside orifice member it is possible to vary the cross sectional area of the cylindrical gap 184.

Figure 12:
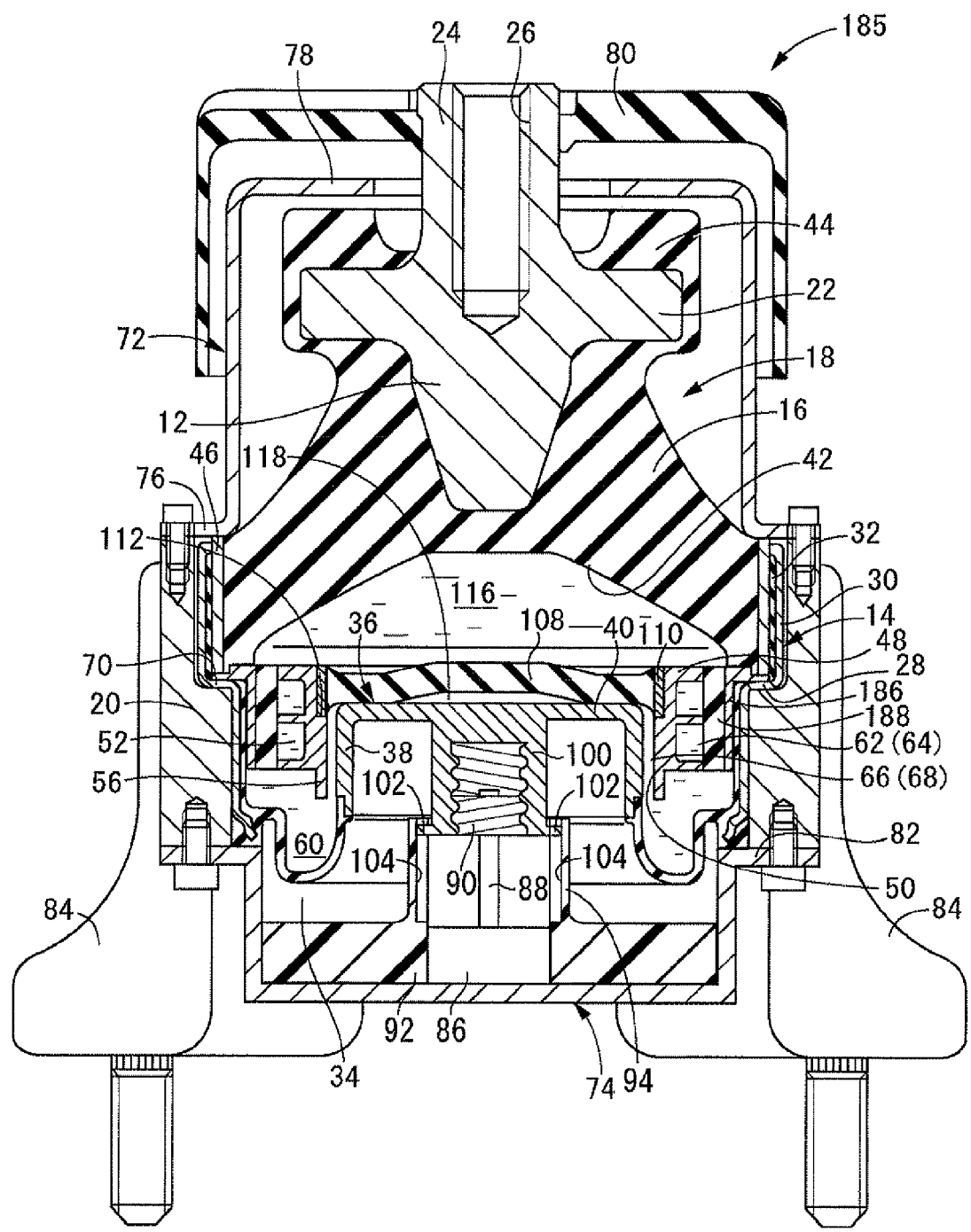
FIG. 12 is a longitudinal cross sectional view of an engine mount according to a seventh embodiment of the present invention.

The description next turns to an engine mount 185 as a seventh embodiment of the fluid-filled type vibration damping device according to the present invention, making reference to FIG. 12. The engine mount 185 of the present embodiment differs from the engine mount (106) of the second embodiment in that the outside orifice member 48 is elastically supported in a condition of being displaceable in the direction of oscillatory displacement of the inside orifice member 36.

Specifically, the outside orifice member 48 is elastically supported in the direction of oscillation of the inside orifice member 36 by a cylindrical rubber support 188 that is anchored to the inside peripheral face of a fastener tube fitting 186 secured fitting into the second mounting member 14. Under these conditions, the outside peripheral face of the outside orifice member 48 is in intimate contact against the inside peripheral face of the cylindrical rubber support 188. This ensures good sealing of the low-frequency orifice passage 64.

In the engine mount 185 constructed in this way, oscillatory driving of the outside orifice member 48 is possible as well, so that a large piston surface area may be assured. It is possible for pressure control of the first fluid chamber 58 to be carried out efficiently as a result.

As an aid to understanding, in FIG. 12 components that are comparable in construction to components employed in the second embodiment have been assigned the same drawing symbols as in the second embodiment.

Figure 13:
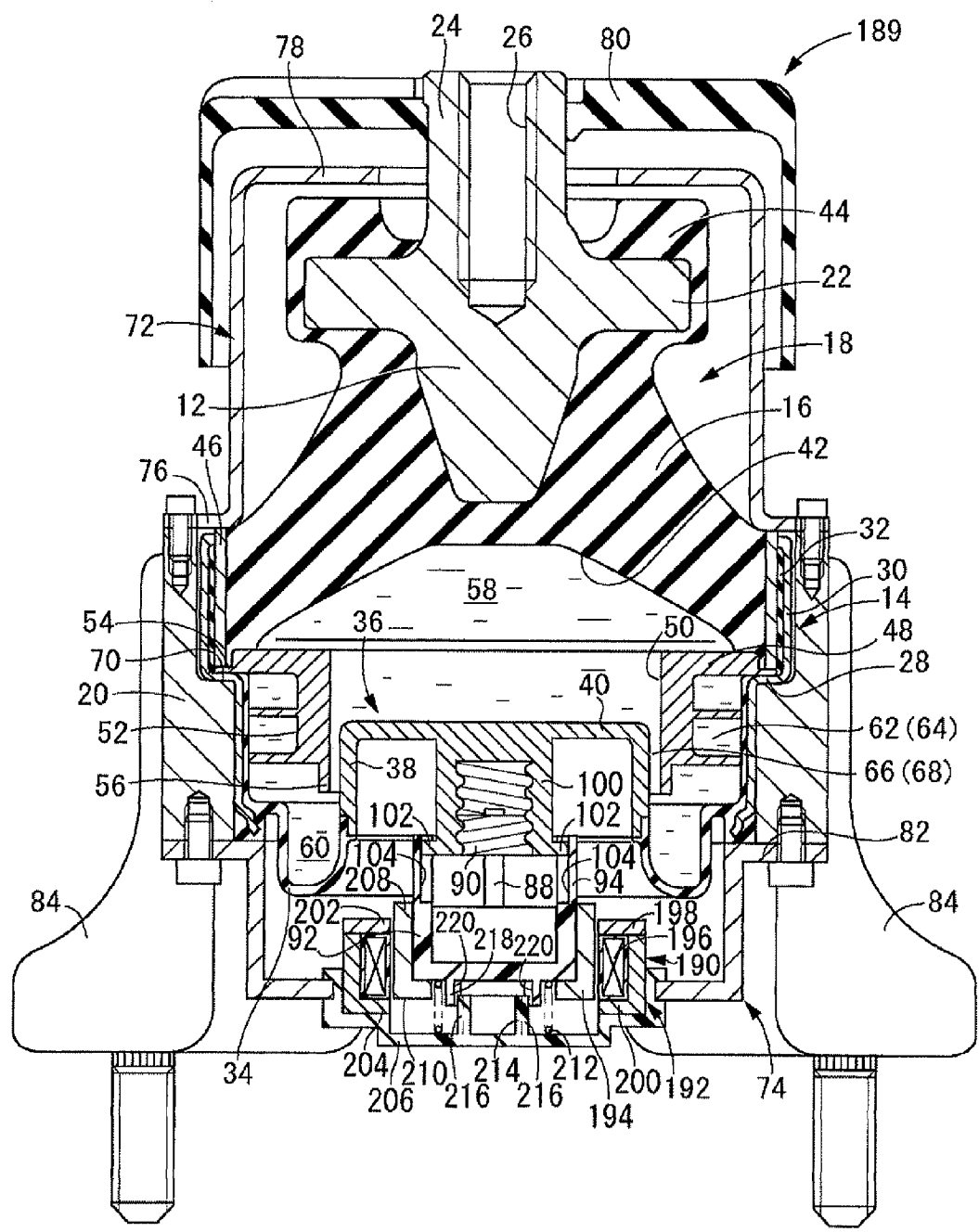
FIG. 13 is a longitudinal cross sectional view of an engine mount according to an eighth embodiment of the present invention.

The description next turns to an engine mount 189 as an eighth embodiment of the fluid-filled type vibration damping device according to the present invention, making reference to FIG. 13. The engine mount 189 of the present embodiment differs from the engine mount (10) of the first embodiment in that oscillatory driving in the vertical direction takes place through a solenoid type oscillator 190 for which the electric motor 86 serves as oscillatory driving member.

To describe in greater detail, the solenoid type oscillator 190 is composed of a magnetic pole-generating member 192 provided as the stator, and an armature 194 provided as the moving part and disposed so as to be relatively displaceable in the axial direction with respect to the magnetic pole-generating member 192.

The magnetic pole-generating member 192 is composed of a coil 196, and an upper yoke 198 and a lower yoke 200 which are arranged surrounding the coil 196. The upper yoke 198 is made of ferromagnetic material and is annular disk shaped with a through-hole. The lower yoke 200 is made of ferromagnetic material and has bottomed round cylindrical shape. A through-hole is formed in the center of the base wall of the lower yoke 200. The upper yoke 198 and the lower yoke 200 make up a stator-side flux path through which flows magnetic flux produced when the coil 196 is energized, and the inside peripheral rim portions of the upper and lower through holes respectively serve as magnetic pole portions 202, 204 in which magnetic poles are generated when the coil 196 is energized. The magnetic pole-generating member 192 constructed in this manner is arranged resting on the base wall of a bottomed cylindrical support member 206 that is attached to the base wall of the base fitting 74, and is secured to the base fitting 74.

Meanwhile, the armature 194 is made of ferromagnetic material and has bottomed round cylindrical shape. An aperture is formed in the base wall section of the armature 194. This armature 194 is slipped around the outside of a support member 92 of bottomed round cylindrical shape from the basal side, and secured to the support member 92. Then, the armature 194 is inserted through the center hole of the magnetic pole-generating member 192 from above, and arranged in relatively displaceable fashion in the axial direction on a center axis coincident with that of the magnetic pole-generating member 192. An axial upper end portion 208 and lower end face 210 of the armature 194 serve as zones of action of magnetic force; and between the axial upper end portion 208 of the armature 194 and the magnetic pole portion 202 of the upper yoke 198, and between the lower end face 210 of the armature 194 and the magnetic pole portion 204 of the lower yoke 200, respectively, there are formed magnetic gaps across which effective magnetic attractive force acts.

According to the present embodiment, with the armature 194 and the magnetic pole-generating member 192 assembled in this way, a coil spring 212 is arranged between the support member 92 and the bottomed cylindrical support member 206. A guide projection 216 formed on the outside peripheral face of a cylindrical portion 214 that protrudes from the base wall of the bottomed cylindrical support member 206 is positioned within a guide groove 220 that is formed in the inside peripheral face of a cylindrical portion 218 that protrudes axially outward (downward) from the base wall of the support member 92. This arrangement prevents the support member 92 from turning with respect to the bottomed cylindrical support member 206 and the base fitting 74.

In the engine mount constructed in the above manner, by alternately energizing the coil 196 so that the action of magnetic attractive force generated thereby between the axial upper end portion 208 of the armature 194 and the magnetic pole portion 202 of the upper yoke 198, and between the lower end face 210 of the armature 194 and the magnetic pole portion 204 of the lower yoke 200, respectively, drives the armature 194 downward in the axial direction, and then ceasing energization of the coil 196 so that the resilience of the coil spring 212 acts on the support member 92, the inside orifice member 36 may be subjected to the action of driving force corresponding to the vibration being damped, so as to provide dynamic vibration damping action through internal pressure control of the first fluid chamber 58.

Energization of the coil 196 may be controlled, for example, through feedback control such as adaptive control using the engine ignition signal of the power unit as a reference signal, and the vibration sensor signal for component targeted for damping (the vehicle body) as an error signal; or through map control on the basis of predetermined control data. As in the first embodiment, the passage length of the orifice passage 68 may be varied through drive control of the electric motor 86.

While the present invention has been described in detail through several presently preferred embodiments, it is to be understood that the invention is by no member limited to the details of the illustrated embodiments.

For example, in the preceding first to eighth embodiments, it is not necessary to provide the low-frequency orifice passage 64. In the third embodiment, it is not necessary to provide the high-frequency orifice passage 136. The tuning frequencies of the orifice passages are not limited to those settings disclosed in the preceding first to eighth embodiments. For example, in the first to eighth embodiments, the orifice passages 68, 168, 178 may be designed to vary over a frequency range different from the frequency range of idling vibration, such as normal driving rumble or noise occurring during acceleration.

The present invention is of course applicable as well to a fluid-filled type vibration damping device of the structure disclosed in JP-A 2006-17134, in which the equilibrium chamber is disposed above the main rubber elastic body. Specifically, there could be employed an arrangement in which the first mounting member serves as the outside orifice member, and the inside orifice member is disposed inserted from the outside into the outside orifice member.

In the preceding second embodiment, a metal mass may be anchored to the moveable rubber film 108 to tune it to the frequency at which the moveable rubber film 108 exhibits elastic resonance (the natural frequency of the moveable rubber film 108).

In the preceding second embodiment, the second fluid chamber 60 may be replaced by a first equilibrium chamber connecting to the primary fluid chamber 116 through the low-frequency orifice passage 64, and a second equilibrium chamber connecting to the auxiliary fluid chamber 118 through the orifice passage 68.

In the preceding third embodiment, the second fluid chamber 60 may be replaced by a first equilibrium chamber connecting to the primary fluid chamber 132 through the low-frequency orifice passage 64, and a second equilibrium chamber connecting to the auxiliary fluid chamber 134 through the orifice passage 68.

In the present invention, the actuator is not limited to an electric motor. Other arrangements in which, for example, the actuator is constituted by a solenoid, or the actuator is constituted by a cam mechanism and an electric motor adapted to drive a cam member making up the cam mechanism could also be employed.

In the preceding first to eighth embodiments, the rotational drive power of the electric motor 86 may be transmitted to the external thread member 90 via a reduction gear train.

Whereas the preceding first to eighth embodiments described specific examples of implementation of the present invention in an automotive engine mount, the invention has potential implementation in automotive body mounts and member mounts, as well as in vibration damping units in various non-automotive devices.

KEY TO SYMBOLS

10: engine mount (fluid-filled type vibration damping device); 12: first mounting member; 14: second mounting member; 16: main rubber elastic body; 36: inside orifice member; 48: outside orifice member; 50: passage hole; 58: first fluid chamber; 60: second fluid chamber; 64: low-frequency orifice passage; 66: cylindrical gap; 68: orifice passage; 86: electric motor (actuator); 88: rotating shaft; 108: moveable rubber film; 116: primary fluid chamber; 118: auxiliary fluid chamber; 124: supporting rubber film; 140: first equilibrium chamber; 164: second equilibrium chamber

The invention claimed is:

1. A fluid-filled type vibration damping device comprising:
a first fluid chamber and a second fluid chamber respectively filled with non-compressible fluid and which experience relative pressure fluctuations during vibration input;
an orifice passage through which the first fluid chamber and the second fluid chamber communicate with one another;
an outside orifice member having a passage hole that defines an outside peripheral wall face of the orifice passage;
an inside orifice member arranged inserted into the passage hole of the outside orifice member from one opening thereof and defining an inside peripheral wall face of the orifice passage;
the orifice passage defined by a cylindrical gap formed between inside and outside peripheral faces of the outside orifice member and the inside orifice member; and
an actuator adapted to adjust an insertion distance of the inside orifice member into the outside orifice member,
wherein a passage length of the orifice passage is variable through adjustment with the actuator of the insertion distance of the inside orifice member into the outside orifice member,
wherein the actuator is composed of an electric motor that is arranged such that a rotational driving force generated by the electric motor is applied to the inside orifice member via a screw mechanism as a reciprocating drive force to make an insertion/withdrawal displacement of the inside orifice member with respect to the outside orifice member,
wherein the screw mechanism comprises an external thread member rotated by the electric motor and an internal thread portion provided on the inside orifice member, and the screw mechanism is provided with interlocking portions for preventing a rotation of the inside orifice member with respect to the outside orifice member, while permitting the insertion/withdrawal displacement of the inside orifice member with respect to the outside orifice member, and
wherein a tuning frequency of the orifice passage is variable by changing the passage length of the orifice passage without changing a distance of the cylindrical gap between the inside and outside peripheral faces of the outside orifice member and the inside orifice member over an entire length of the orifice passage.

2. The fluid-filled type vibration damping device according to claim 1, wherein the first fluid chamber is constituted by a primary fluid chamber adapted to give rise to pressure fluctuations at times of vibration input and whose wall is constituted in part by a moveable rubber film, and an auxiliary fluid chamber situated on an opposite side of the moveable rubber film from the primary fluid chamber and adapted to receive pressure fluctuations of the primary fluid chamber transmitted on a basis of an elastic deformation of the moveable rubber film, and whose wall is defined in part by the inside orifice member; the second fluid chamber is adapted to readily undergo changes in volume; and the auxiliary fluid chamber and the second fluid chamber communicate with one another through the orifice passage.

3. The fluid-filled type vibration damping device according to claim 2, wherein the moveable rubber film is positioned covering an opening at the primary fluid chamber end of the passage hole of the outside orifice member, and the inside orifice member, when positioned intruding into the passage hole of the outside orifice member from another opening thereof at an opposite end from the primary fluid chamber, is displaceable in a direction approaching the moveable rubber film until coming into contact against the moveable rubber film.

4. The fluid-filled type vibration damping device according to claim 1, wherein the inside orifice member is cylindrical shaped having a supporting rubber film disposed covering one opening thereof; the inside orifice member is mounted on an output shaft of the actuator via the supporting rubber film; the supporting rubber film partially constitutes the wall of the first fluid chamber adapted to give rise to pressure fluctuation at times of vibration input; and the second fluid chamber readily permits changes in volume.

5. The fluid filled type vibration damping device according to claim 1, wherein the device includes a low-frequency orifice passage through which the first fluid chamber and the second fluid chamber communicate with one another.

6. The fluid-filled type vibration damping device according to claim 5, wherein a tuning frequency of the low-frequency orifice passage is set within a variable tuning frequency range of the orifice passage.

7. The fluid-filled type vibration damping device according to claim 5, wherein the second fluid chamber includes a first equilibrium chamber connected to the first fluid chamber through the low-frequency orifice passage, and a second equilibrium chamber connected to the first fluid chamber through the orifice passage and independent of the first equilibrium chamber.

8. The fluid-filled type vibration damping device according to claim 1, wherein a first mounting member is arranged spaced apart from one opening of a second mounting member of cylindrical shape, the first mounting member and the second mounting member being linked by a main rubber elastic body; and the outside orifice member is fitted into and secured within the second mounting member while the inside orifice member is arranged inserted into the passage hole of the outside orifice member from another opening of the second mounting member, thereby orienting the orifice passage so as to extend in an axial direction of a mount.

9. The fluid-filled type vibration damping device according to claim 8, wherein the device includes a low-frequency orifice passage through which the first fluid chamber and the second fluid chamber communicate with one another, and the low-frequency orifice passage is formed in the outside orifice member.

10. The fluid-filled type vibration damping device according to claim 2, wherein a first mounting member is arranged spaced apart from one opening of a second mounting member of cylindrical shape, the first mounting member and the second mounting member being linked by a main rubber elastic body; the outside orifice member of cylindrical shape is fitted into and secured within the second mounting member with the moveable rubber film disposed covering one opening of the outside orifice member; the primary fluid chamber whose wall is constituted in part by the main rubber elastic body is formed to one side of the moveable rubber film and adapted to give rise to pressure fluctuations at times of vibration input, while the auxiliary fluid chamber to an other side of the moveable rubber film receives pressure fluctuations of the primary fluid chamber transmitted on the basis of the elastic deformation of the moveable rubber film; the inside orifice member is arranged inserted into the passage hole of the outside orifice member from an other opening of the second mounting member; and the second fluid chamber adapted to readily permit changes in volume is formed further towards another opening of the second mounting member than the outside orifice member, with the auxiliary fluid chamber and the second fluid chamber communicating with one another through the orifice passage.

11. The fluid-filled type vibration damping device according to claim 4, wherein a first mounting member is arranged spaced apart from one opening of a second mounting member of cylindrical shape, the first mounting member and the second mounting member being linked by a main rubber elastic body; the outside orifice member is fitted into and secured within the second mounting member while the inside orifice member of cylindrical shape is arranged inserted into the passage hole of the outside orifice member from an other opening of the second mounting member; the first fluid chamber whose wall is constituted in part by the supporting rubber film is arranged covering the main rubber elastic body and one opening of the inside orifice member; and the second fluid chamber adapted to readily permit changes in volume is formed further towards the other opening of the second mounting member than the outside orifice member.

12. The fluid-filled type vibration damping device according to claim 7, wherein a first mounting member is arranged spaced apart from one opening of a second mounting member of cylindrical shape, the first mounting member and the second mounting member being linked by a main rubber elastic body; the outside orifice member of cylindrical shape is fitted into and secured within the second mounting member while the inside orifice member is arranged inserted into the passage hole of the outside orifice member from one opening thereof; the first equilibrium chamber adapted to readily permit changes in volume is formed further towards another opening of the second mounting member than the outside orifice member; the first equilibrium chamber and the first fluid chamber whose wall is constituted in part by the main rubber elastic body and adapted to give rise to pressure fluctuations at times of vibration input communicate with one another through the low-frequency orifice passage formed in the outside orifice member; the second equilibrium chamber adapted to readily permit changes in volume is formed inside the passage hole of the outside orifice member; and the first fluid chamber and the second equilibrium chamber communicate with one another through the orifice passage.

13. The fluid-filled type vibration damping device according to claim 1, wherein the actuator is situated in an outside atmosphere.

14. The fluid-filled type vibration damping device according to claim 1, wherein the device is provided with an oscillatory driving member for oscillatory driving of the inside orifice member.

15. The fluid-filled type vibration damping device according to claim 3, wherein the device includes oscillatory driving member for oscillatory driving of the inside orifice member, adapted to produce oscillatory driving with the inside orifice member disposed in contact against the moveable rubber film.

16. The fluid-filled type vibration damping device according to claim 15, wherein the outside orifice member is supported displaceably in a direction of oscillation by the oscillatory driving member.

17. The fluid-filled type vibration damping device according to claim 8, wherein the device includes oscillatory driving member for oscillatory driving of the inside orifice member, adapted to oscillate the inside orifice member in the axial direction of the mount.

18. The fluid-filled type vibration damping device according to claim 10, wherein the device includes oscillatory driving member for oscillatory driving of the inside orifice member, the inside orifice member is situated at a location facing the moveable rubber film in a direction of oscillation by the oscillatory driving member, and the auxiliary fluid chamber is formed between the opposed faces of the inside orifice member and the moveable rubber film.

19. The fluid-filled type vibration damping device according to claim 14, wherein the oscillatory driving member is situated in an outside atmosphere.

20. The fluid-filled type vibration damping device according to claim 14, wherein the oscillatory driving member comprises the actuator.

21. The fluid-filled type vibration damping device according to claim 1, wherein the device includes a low-frequency orifice passage through which the first fluid chamber and the second fluid chamber communicate with one another, and a tuning frequency of the low-frequency orifice passage is set within a variable tuning frequency range of the orifice passage so that upon input of vibration in a tuning frequency of the low-frequency orifice passage, the tuning frequency of the orifice passage is set to a lower frequency than the tuning frequency of the low-frequency orifice passage in order to ensure ample flow of fluid through the low-frequency orifice passage.

* * * * *